(12) United States Patent
Durham

(10) Patent No.: US 6,278,908 B1
(45) Date of Patent: Aug. 21, 2001

(54) COMPUTATIONALLY EFFICIENT CONTROL ALLOCATION

(75) Inventor: Wayne Durham, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 0 days.

(21) Appl. No.: 09/635,684

(22) Filed: Aug. 10, 2000

Related U.S. Application Data

(60) Provisional application No. 60/153,684, filed on Sep. 14, 1999.

(51) Int. Cl.[7] .............................. G05B 15/00; G05B 19/00
(52) U.S. Cl. ............................... 700/262; 700/1; 700/245; 700/251; 700/252; 318/567; 318/568.11; 318/568.2; 342/90; 342/96; 701/23; 701/30; 901/30
(58) Field of Search ................................. 700/1, 262, 245, 700/252, 251; 342/96, 90; 701/23, 301; 318/560, 568.11, 568.2, 567; 901/30

(56) References Cited

U.S. PATENT DOCUMENTS

| 5,406,289 | * | 4/1995 | Barker et al. | 342/96 |
| 5,537,119 | * | 7/1996 | Poore, Jr. | 342/96 |
| 5,959,574 | * | 9/1999 | Poore, Jr. | 342/96 |

OTHER PUBLICATIONS

Lu et al., A Scheduling Quasi–MinMax MPC for LPV Systems, Jun. 1999, IEEE, pp. 2272–2276.*
Veres et al., Adaptive Pole–Placement Control Using Parameter Bounds, 1991, IEEE, pp. 2860–2865.*
Durham, WC., "Constrained Control Allocation," Journal of Guidance, Control and Dynamics, vol. 16, No. 4, 1993, pp. 717–725.
Durham, WC., "Attainable Moments for the Constrained Control Allocation Problem," Journal of Guidance, Control, and Dynamics, vol. 17, No. 6, 1994, pp. 1371–1373.

(List continued on next page.)

Primary Examiner—William A. Cuchlinski, Jr.
Assistant Examiner—McDieunel Marc
(74) Attorney, Agent, or Firm—McGuireWoods LLP

(57) ABSTRACT

A computationally efficient method for calculating near-optimal solutions to the three-objective, linear control allocation problem is disclosed. The control allocation problem is that of distributing the effort of redundant control effectors to achieve some desired set of objectives. The problem is deemed linear if control effectiveness is affine with respect to the individual control effectors. The optimal solution is that which exploits the collective maximum capability of the effectors within their individual physical limits. Computational efficiency is measured by the number of floating-point operations required for solution. The method presented returned optimal solutions in more than 90% of the cases examined; non-optimal solutions returned by the method were typically much less than 1% different from optimal and the errors tended to become smaller than 0.01% as the number of controls was increased. The magnitude of the errors returned by the present method was much smaller than those that resulted from either pseudo inverse or cascaded generalized inverse solutions. The computational complexity of the method presented varied linearly with increasing numbers of controls; the number of required floating point operations increased from 5.5 i, to seven times faster than did the minimum-norm solution (the pseudoinverse), and at about the same rate as did the cascaded generalized inverse solution. The computational requirements of the method presented were much better than that of previously described facet-searching methods which increase in proportion to the square of the number of controls.

13 Claims, 14 Drawing Sheets

OTHER PUBLICATIONS

Durham, WC., "Constrained Control Allocation: Three-Moment Problem," Journal of Guidance, Control, and Dynamics, vol. 17, No. 2, 1994, pp. 330–336.

Bolling, JG and Durham, WC., "Control Allocation with Adaptive Failure Control," AIAA 97–3775 Aug. 1997.

Bordignon, KA., "Constrained Control Allocation for Systems with Redundant Control Effectors," Ph.D. Thesis, Aerospace & Ocean Engineering, Virginia Polytechnic Institute & State University, 252 pp. 1996.

Bolling, JG., "Implementation of Constrained Control Allocation Techniques Using an Aerodynamic Model of An F15 Aircraft," MS Thesis, Aerospace & Ocean Engineering, Virginia Polytechnic Institute & State University, 285 pp. 1997.

Buffington, JM., "Tailless Aircraft Control Allocation," AIAA 97–3605, Aug., 1997.

Enns, D., "Control Allocation Approaches," AIAA 98–4109, Aug. 1998.

Durham, WC., Computationally Efficient Control Allocation, AIAA Paper 99–4214, Aug. 1999.

Ziegler, GM., Lectures on Polytopes, Graduate Texts in Mathematics, $1^{st}$ (rev) ed., vol. 152 Springer–Verlag, New York, 1995, pp. 51–52.

Scalera, KR., "A Comparison of Control Allocation Methods for the F–15 Active Research Aircraft Utilizing Real–Time Piloted Simulations," MS Thesis, Virginia Polytechnic Institute & State University, 1999.

Ziegler, GM., Lectures on Polytopes, Graduate Texts in Mathematics, $1^{st}$ (rev) ed., vol. 152 Springer–Verlag, New York, 1995, pp. 198–208.

Agarwal, PK., "Range Searching" Handbook of Discrete and Computational Geometry, ed. JE Goodman and O'Rourke, CRC Press LLC; Boca Raton, New York 1997, pp. 575–598.

Pellegrini, M., "Ray Shooting and Lines in Space" in Handbook of Discrete and Computational Geometry, ed JE Goodman and O'Rourke, CRC Press LLC; Boca Raton, New York, 1997, pp. 599,614.

Virnig, JC and Bodden, DS., "Multivariable Control Allocation and Control Law Conditioning when Control Effectors Limit" AIAA 94–3609, Aug. 1994.

Durham, WC and Bordignon, KA, "Multiple Control Effector Rate Limiting," AIAA, Journal of Guidance, Control, and Dynamics, vol. 19, No. 1, pp. 30–37.

Durham, WC, Bolling, JC and Bordignon, KA, "Minimum Drag Control Allocation," AIAA, Journal of Guidance, Control, and Dynamics, vol. 19, No. 1, pp. 190–193.

Bordignon, K and Durham, WC., "Nullo–Space Augmented Pseudo–Inverse Solutions to Constrained Control Allocation Problems," AIAA 95–3209, Aug. 1995.

Bordignon, KA and Durham, WC., Closed–Form Solutions to Constrained Control Allocation Problem, Journal of Guidance, Control and Dynamics, AIAA, vol. 18, No. 5, pp. 1000–1007.

Durham, WC, "Efficient, Near–Optimal Control Allocation," Journal of Guidance, Control and Dynamics, AIAA, vol. 22, No. 2, pp. 369–372.

* cited by examiner

COMPUTATIONALLY EFFICIENT CONTROL ALLOCATION

This application claims the benefit of U.S. Provisional Application Serial No. 60/153,684, filed on Sep. 14, 1999, the entire contents of which is incorporated by reference herein.

The U.S. Government has a paid-up license in this invention and the right in limited circumstances to require the patent owner to license others on reasonable terms as provided for by the term of Grant/Contract NAG-1-1449 awarded by NASA.

BACKGROUND OF THE INVENTION

1. Field of the Invention

This invention generally relates to solving control allocation problems, and more particularly to a method for calculating optimal and/or near-optimal solutions to a three-objective control allocation problem, for example, of the type used in setting control surfaces (i.e,. moment generators) of an aircraft.

2. Description of the Related Art

Traditional aircraft design included three aerodynamic controls for each of the rotational degrees of freedom: ailerons for roll, elevator for pitch, and rudder for yaw. Modern tactical aircraft have more than the classical three moment generators in numbers nearing twenty.

The redundancy of these control effectors admits of an infinite number of combinations that satisfy a particular objective, so long as the physical limits of the effectors are not considered. Consideration of these physical limits leads to unique solutions at the maximum collective capabilities of the effectors. The distribution of these several controls to achieve specific objectives is the general control allocation problem. The determination of the unique combinations of control effectors that yield maximum collective capabilities is the optimal control allocation problem. A particular solution to the general problem, if attainable, may be found by scaling the optimal solution. All other solutions to the general problem may then be characterized as that particular solution plus components of deflection that do not change the attained objective, i.e., that lie in the null space of the control effectiveness matrix.

Development of the geometry of the control allocation problem is explained in Durham, W. C., "Constrained Control Allocation," Journal of Guidance, Control, and Dynamics, 1993, 16(4), pp. 717–725; Durham, W. C. "Attainable Moments for the Constrained Control Allocation Problem," Journal of Guidance, Control, and Dynamics, 1994, 17(6), pp. 1371–1373; and Durham, W. C. "Constrained Control Allocation: Three-Moment Problem," Journal of Guidance, Control, and Dynamics, 1994,17(2), pp. 330–336. The geometry of the attainable moments in the three-objective problem is, in general, the projection of an m-dimensional rectangular box (where m is the number of control effectors) into three dimensions. The resulting polytope is a generalized zonotope (see Ziegler, G. M., Lectures on Prototypes First (revised) ed. "Graduate Texts in Mathematics," ed. Vol. 152, 1995, p. 370), differing from a true zonotope only in that the m-dimensional rectangular box is not required to be a cube. Methods of solving the optimal allocation problem may be loosely divided into two groups: Those that explicitly calculate all or part of the geometry of the subset of attainable moments, and those that do not.

Calculation of the geometry of the subset of attainable moments is simple but requires m (m−1) sets of calculations. This geometry is presented as equations that define individual facets of the polytope. The optimal control allocation problem is then to take an arbitrary half-line in three-dimensional objective space and determine with which facet it intersects. This is a well-known problem in computational geometry. See, for example, Agarwal, P. K., Range Searching, in the Handbook of Discrete and Computational Geometry, 1997, CRC Press LLC, pp. 575–598; and Pellegrini, M., Ray Shooting and Lines in Space, in the Handbook of Discrete and Computational Geometry, 1997 CRC Press LLC, pp. 599–614. There the problem is often posed as how the facets should be represented in order to efficiently calculate the required intersection.

The calculation of the complete geometry of the polytope is by itself of sufficient computational complexity as to render it impractical for real-time implementation in current flight control computers. It is not desirable to pre-calculate the geometry for at least two reasons. First, the attainable moments continually change with the state of the aircraft and pre-calculation would require a large amount of storage to adequately represent the flight envelope. Second, control redundancy makes feasible real-time reconfiguration following control failure identification. The number of permutations of control failures required to account for all eventualities is quite large, and each permutation creates a new polytope. Therefore, there is no current interest in methods of solving the optimal allocation problem that requires calculation of the complete geometry of the attainable moments.

The method of solving the optimal control allocation problem as previously practiced does not generally require calculation of the complete geometry of the polytope. Instead, facets are generated in pairs and tested until the facet containing the intersection is found. Extensive efforts have been made to find ways to ensure that the solution was found quickly, i.e., with few facets being generated. While these methods can reduce the average search time, none of these methods are able to obviate the worst-case possibility in which all the facets have to be generated.

Only two other control allocation methods have demonstrated the capability to generate optimal, or near-optimal, solutions: The method of cascaded generalized inverses and linear programming methods. Cascaded generalized inverse (CGI) algorithms have computational requirements that vary linearly with the number of controls, but frequently return solutions to optimal problems that have extremely large errors in both the magnitude and direction of its solutions. See Bordingnon, K. A., "Constrained Control Allocation for Systems with Redundant Control Effectors," Aerospace & Ocean Engineering, Virginia Polytechnic Institute & State University, 252, 1996.

Linear programming methods typically do return admissible solutions to optimal problems, but have computational requirements as bad or worse than the facet-searching method. See Bordingnon, K. A., "Constrained Control Allocation for Systems with Redundant Control Effectors," Aerospace & Ocean Engineering, Virginia Polytechnic Institute & State University, 252, 1996; Buffington, J. M., "Tailless Aircraft Control Allocation," AIAA-97-3605, AIAA Guidance, Navigation, and Control, August 1997; and Enns, "Control Allocation Approaches," AIAA 98-4109, Guidance, Navigation, and Control, August 1998.

In view of the foregoing, it is therefore clear that there is a need for a method of determining optimal and/or near-optimal solutions for a control allocation problem that is more computationally efficient than previous methods.

SUMMARY OF THE INVENTION

It is one object of the present invention to provide an improved method for calculating a solution to a control allocation problem, and more specifically one which determines the optimal combination of control effectors of an aircraft, robot, or other machines with a greatly reduced number of floating-point operations than required by existing methods, as well as improved accuracy and reduced errors compared with existing methods.

The foregoing and other objects of the invention are achieved by a method for calculating optimal and/or near-optimal solutions to a three-objective control allocation problem. The method includes defining a solution space, rotating the solution space until one dimension of an optimal point is recognized, determining an intersection of an optimal point in at least one other dimension, and setting control effectors of an aircraft based on said optimal points. The defining step includes defining a polytope representing said three-objective control allocation problem, and the rotating step includes rotating said polytope.

DESCRIPTION OF THE PREFERRED EMBODIMENTS

The present invention is a method of solving the three-objective optimal control allocation problem. First and second preferred embodiments of this method solve the three-objective, optimal control allocation problem by solving a series of two-dimensional problems. The solution may be used to characterize all solutions to the general control allocation problem, and may be used as the basis for solution of the four-dimensional optimal objective problem.

1. The First Preferred Embodiment

The first preferred embodiment of the method of the present invention addresses the following problem statement:

Problem Statement

The problem statement involves a linear map B from $\Re^m \to \Re^3$, y=Bu, where u $\in \Re^m$ are the controls with effectiveness B in generating the objectives y$\in \Re^3$. The subset of admissible controls is $\Omega$, u$\in \Omega \Leftrightarrow u_{Min,i} \leq u_i \leq u_{Max,i}$, where i=1 . . . m. The subset of attainable objectives $\Phi$ is the image of $\Omega$, y=Bu$\in \Phi \Leftrightarrow u \in \Omega$. The three-objective optimal control allocation problem is, given B, $\Omega$, and a half-line l in the direction of some arbitrary desired objective $y_d$, find the intersection of l with $\partial(\Phi)$, the convex hull of $\Phi$. In a preferred embodiment of the invention, it is desired that the computational complexity of the algorithm used to calculated the intersection increases linearly with m.

The Two-Dimensional Problem

Figure 1:
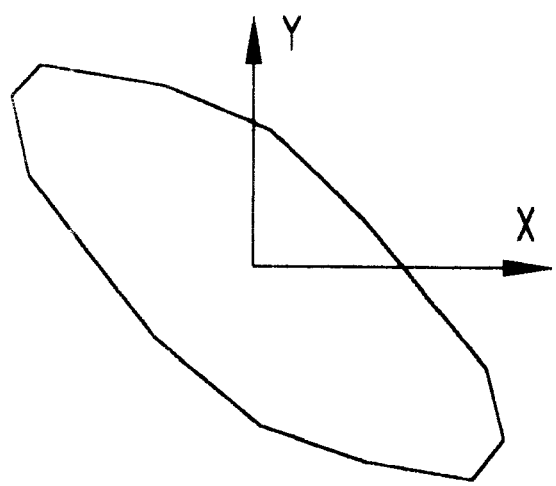
FIG. 1 is a diagram showing a two-objective attainable moment solution space (AMS) for a control allocation problem with seven controls, where the x and y axes represent the two objectives.

Before examining the solution to the three objective optimal allocation problem determined in accordance with the present invention, a similar two-dimensional problem is considered in which y$\in \Re^2$. FIG. 1 shows the attainable objectives for a randomly generated problem with seven controls. The x and y coordinates represent the two objectives.

A For this problem, B$\in \Re^{2 \times m}$ and B is considered as the following two row vectors:

$$B = \begin{bmatrix} r_1 \\ r_2 \end{bmatrix} \quad (1)$$

Figure 2:
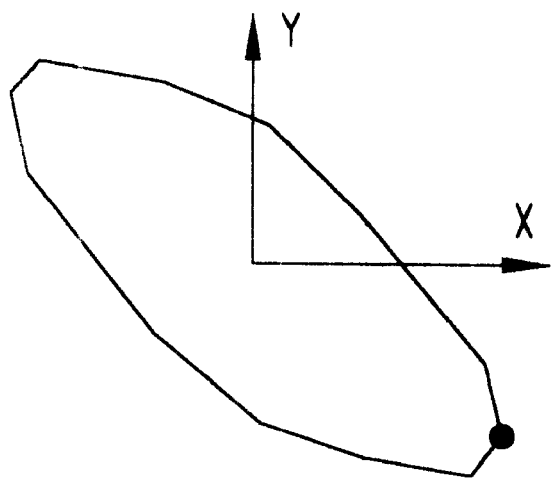
FIG. 2 is a diagram showing the identification of $y_{x,Max}$ for the obtainable objectives in FIG. 1.

It is straightforward to calculate four of the vertices of $\Phi$: the ones with the minimum and maximum x-components and the ones with the minimum and maximum y-components. This is accomplished by examining the signs of the entries in each of $r_1$ and $r_2$. In accordance with a preferred embodiment, we are concerned only with the vertex with the maximum x-component. The x-component for any u is given by $r_1 u$. Therefore, if the sign of a particular entry of $r_1$ is positive, then the corresponding control should be set to its maximum value, and if the sign is negative the control should be set to its minimum value. Denote by $u_{x,Max}$ the vector of controls that results from this operation. The coordinates of the vertex with maximum x-component is then given by $y_{x,Max} = B u_{x,Max}$. The other three vertices are found in similar fashion. FIG. 2 shows $y_{x,Max}$ for the obtainable objectives in FIG. 1.

Vertices alone do not convey much information about the geometry of the problem. Knowing that two vertices are connected by an edge provides a far more substantive indication of this geometry. We now consider a continuous rotation of the x-y axes through an angle $\phi$, represented by $$B' = \begin{bmatrix} r'_1 \\ r'_2 \end{bmatrix} = TB, \quad T = \begin{bmatrix} \cos\phi & \sin\phi \\ -\sin\phi & \cos\phi \end{bmatrix} \quad (2)$$

Figure 3:
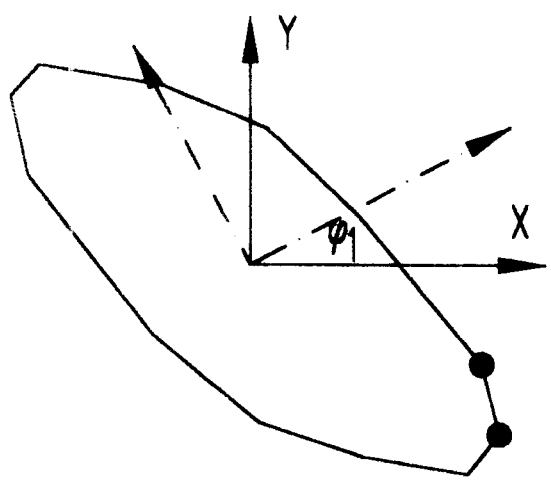
FIG. 3 is a diagram showing a rotation of the two-dimensional AMS of FIG. 1 to identify $y'_{x,Max}$.

As the axes are rotated, the signs of the entries in $r'_1$ will change, identifying new controls $u'_{x,Max}$ and new coordinates for $y'_{x,Max}$ as functions of $\phi$, $u'_{x,Max}(\phi)$ and $y'_{x,Max}(\phi)$. The angle $\phi_1$, at which the first such sign change occurs identifies the controls $u'_{x,Max}(\phi_1)$ and the vertex $y'_{x,Max}(\phi_1)$ that is connected to the original $y'_{x,Max}$ by an edge. The identification of this first edge is shown in FIG. 3. By continuing to increase the angle $\phi$, the complete geometry of $\partial(\phi)$ may be determined.

Clearly, it is impractical to vary $\phi$ and observe when signs of entries in $r'_1$ change. Instead, according to a preferred embodiment of the invention, the angles at which the entries of $r'_1$ are zero are calculated, since this indicates that the sign of that entry will change. This is just another way of saying that a zero in the $i^{th}$ entry of $r'_1$ indicates that x' is perpendicular to all edges that are the images of all edges of $\Omega$ defined by the $i^{th}$ control. Here, the edge in question is one of the two that mapped to the boundary of $\Phi$.

The angle $\phi_j$ at which the $j^{th}$ entry of $r'_1$, $r'_{1,j}$ is zero is given by $$r'_{1,j} = r_{1,j} \cos\phi_j + r_{2,j} \sin\phi_j = 0,$$

$$\phi_j = \pm \tan^{-1}(r_{1,j}/r_{2,j}) \quad (3)$$

By calculating the angle $\phi_j$, j=1 ... m, a list of 2 m angles is created that define each of the vertices of $\Phi$; the list is ordered by control number. To order the list so that edges are defined, the angles are placed in the range $0 \leq \phi_j \leq 2\pi$ and sorted from least to greatest. The sorted indices of the original list then indicate the controls associated with each edge proceeding anti-clockwise from the original vertex, $y_{x,Max}$. This list constitutes sufficient information to reconstruct the complete geometry $\Phi$.

Without loss of generality, assume the desired objective $Y_d$ lies along the x-axis; that is, that 1 is the positive x-axis. A suitable transformation of the problem can always be found to make this true.

Figure 4:
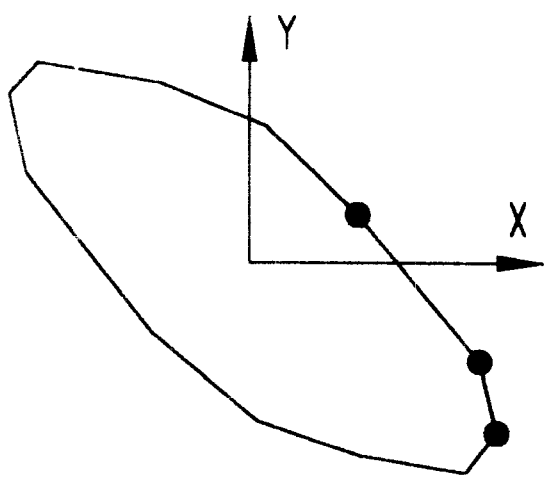
FIG. 4 is a diagram showing a rotation of the two-dimensional AMS of FIG. 1 to identify edge crossing the x-axis.

To solve the optimal allocation problem, the preferred embodiment requires only the edge that crosses the x-axis. That edge is characterized by a change in sign of its y-component when proceeding from one vertex to the next. If the y-component of the original vertex is negative (as shown in FIG. 3), we proceed anti-clockwise through the list, calculating the y-component of each new vertex until its sign changes. If the y-component of $Y_{x,Max}$ is positive, then we proceed clockwise until the edge that crosses the x-axis is identified. The resulting edge for the example problem is shown in FIG. 4.

For computational efficiency, only one quadrant of vertices is required to be sorted, and the change in y-component of each vertex may be calculated by subtracting the contribution of the vertex being left and adding the component of the next vertex. The actual values of the angles $\phi_j$, j=1 ... m are not required, just their relative magnitude. Based on this observation, a very coarse approximation to the arctangent function may be used.

The Three-Dimensional Problem

The case of $B \in \Re^{3 \times m}$ is now considered. Similar to the two-dimensional problem:

$$B = \begin{bmatrix} r_1 \\ r_2 \\ r_3 \end{bmatrix} \quad (4)$$

Figure 5:
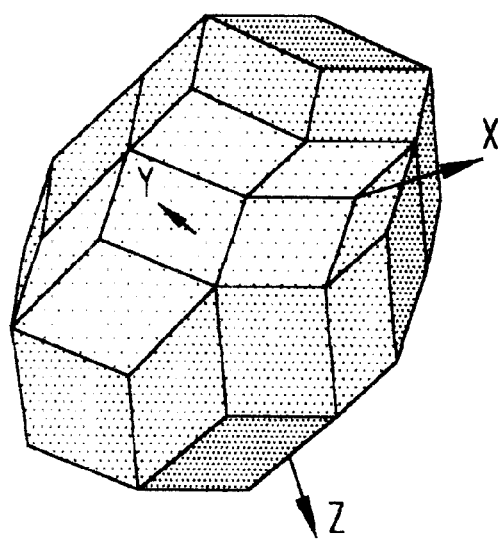
FIG. 5 is a diagram showing a three-dimensional AMS in an arbitrary orientation.

FIG. 5 shows the attainable objectives for a randomly generated problem with seven controls. The x, y and z coordinates represent the three objectives. As with the two-objective problem, it is assumed that the three-objective problem has been transformed by $T_x B$ so that 1 is the positive x-axis. The transformation $T_x$ is, of course, not unique, since any additional rotation $T_\theta$ purely about the x-axis leaves 1 aligned with the positive x-axis. The subset of attainable moments from along the positive z-axis is now viewed, the result of which is shown in FIG. 6.

Figure 6:
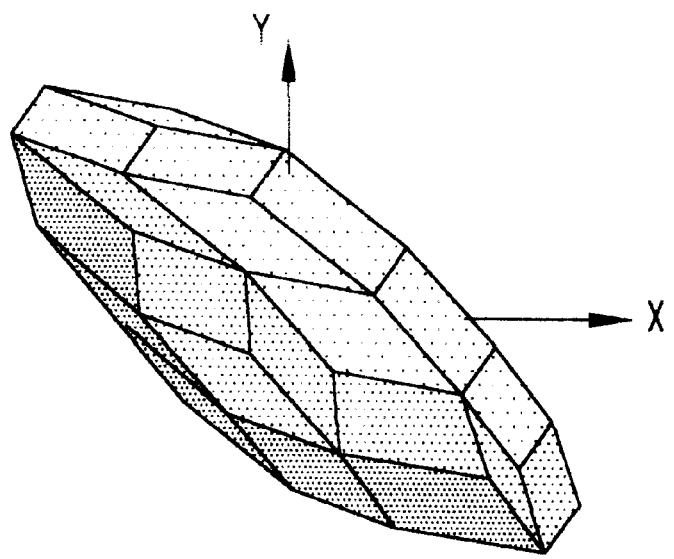
FIG. 6 is a diagram showing an orientation of the three-dimensional AMS of FIG. 5 with l aligned with the x-axis.

FIG. 6 is the same as FIG. 1 with the extra detail of the facets of the three-dimensional polytope. The intersection of 1 with the facet that contains the solution is shown. Denote the point of intersection p. We may treat FIG. 6 as a two-dimensional problem and identify the edge that crosses the x-axis, but that edge does not in general form part of the desired facet. Even if that edge did form part of the desired facet, a single edge is insufficient to define a facet.

Figure 7:
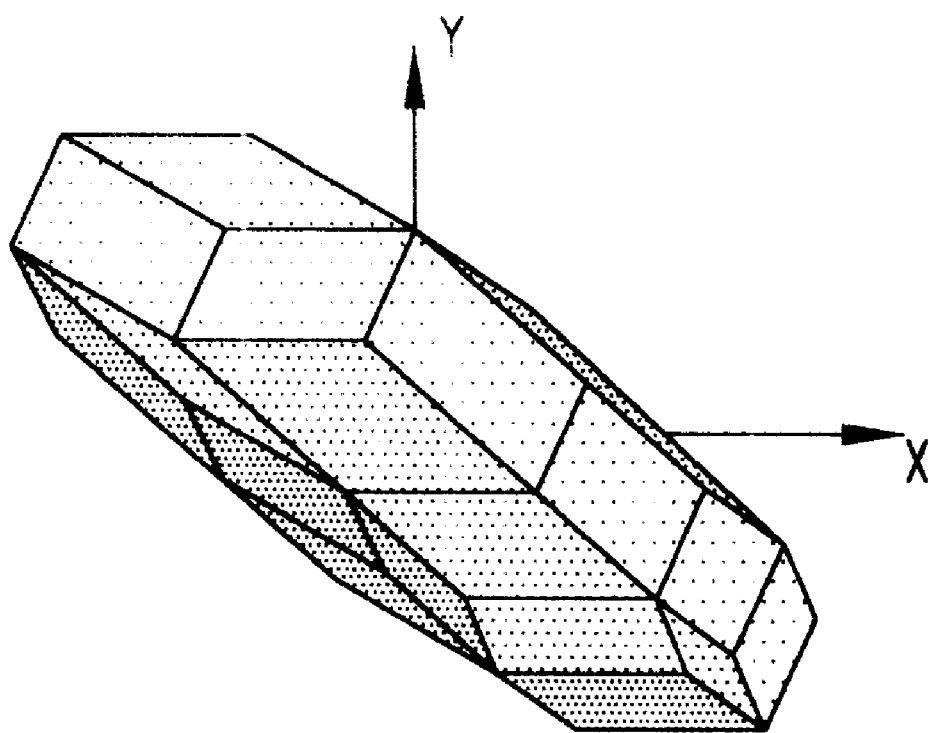
FIG. 7 is a diagram showing an orientation of the three-dimensional AMS of FIG. 5 following a rotation about the x-axis.

Now consider the additional rotation $T_\theta$ about the x-axis. It is clear that there is some angle $\theta_p$ at which the point p will lie exactly on the limb of the three-dimensional polytope as viewed from the positive z-axis (there are actually two, separated by $\pi$ radians). Because the point p lies in a facet of the three-dimensional polytope, the orientation for which it lies exactly on the limb of the polytope is that for which the plane of the facet is parallel to the z-axis from which the limb is viewed. One of these two cases is shown in FIG. 7.

Assume that the angle $\theta_p$ can be found. For some suitably small changes $\pm\Delta\theta_p$ in $\theta_p$, the point p will rotate forward and backward from its position exactly on the limb, and two of the edges that define the facet that contains p will alternately constitute the edge of the two-dimensional figure, one that is "in front" of p and one that is "behind" p. The edge that is "in front" has a positive z-component, and the one that is "behind" has a negative z-component. Each of these two edges may be identified exactly as was done for the two-objective optimal allocation problem.

The angle $\theta_p$ cannot be determined analytically, but that angle is not what is needed: just the two edges that lie in front of and behind p. To find these two edges, we begin with some arbitrary orientation such as shown in FIG. 6. The edge of the two-dimensional figure that crosses the x-axis is identified and its z-component calculated. The figure is rotated in three-dimensions through an angle $\theta_0$ about the x-axis and another edge is identified. This is repeated until the sign of the z-component of the identified edge changes. The last two edges identified—one in front of the x-axis and one behind—are candidates for defining the desired facet. If they define a facet that contains the point p the problem is solved. If not, then the direction of rotation is reversed and a smaller angle $\theta_1$ is used. This process is repeated until the facet is identified.

There is no theoretical lower limit to the size of the angle to be used in a given rotation. In computer applications there is a practical lower limit that depends on the numerical precision employed, because the sine and cosine of some suitably small angle will be represented as exactly 0 and 1. This limit is obviously machine-dependent.

An Exemplary Implementation

The algorithm described above was implemented in version 5 of MATLAB. The number of floating point operations required was determined using the MATLAB function flops. The initial angle was $\pi/4$ and bisection was used at each rotation reversal. The required transformation for any rotation was therefore always one of a small set of transformations, and permitted use of a table of sines and cosines of $\pi/4$, $\pi/8$, $\pi/16$ . . . for use in the transformations and avoided repeated transcendental function calculations. The number of bisections allowed was variable, but an absolute maximum number of bisections was set at nine. This number was arrived at following evaluation of the performance of the algorithm for a broad range of problem sizes, from four controls to 500. If a solution was not found after the prescribed number of bisections, the last two distinct edges found were used to calculate an approximate solution. This approximate solution was calculated by linearly interpolating from the y- and z-coordinates of the vertices of the edges found to find a point on l. The controls associated with those vertices were then combined according to the interpolation factors.

Allocation Methods Implemented

Three other allocation algorithms were also implemented to provide comparison data. The first algorithm was based on the exhaustive facet search described above. The facet-search algorithm did not have provisions to check for special cases, principally those that deal with singular 3×3 partitions of B, but rather added random, small, physically insignificant numbers to the elements of B to avoid mathematical singularities. These perturbations serve as tie-breakers in the event of coplanar facets. The results of the facet-search algorithm were used to ascertain the optimality of the edge-searching algorithm. The number of floating point requirements required for the facet-search algorithm was determined assuming the worst case (last facet examined contains the solution), and used for performance comparison.

The second allocation method implemented was the pseudoinverse. This solution was determined by calculating $P=B^T [BB^T]^{-1}$ using the MATLAB matrix inversion function inv. The solution yielded by the pseudoinverse was uniformly scaled if required to yield admissible control deflections. The number of floating-point operations required for these calculations was used for comparison with the edge-searching algorithm. The pseudoinverse is known to provide inadmissible solutions over a very large range of attainable desired objectives for a given problem. See Bordignon, K. A., "Constrained Control Allocation for Systems with Redundant Control Effectors," Ph.D. Thesis, Aerospace & Ocean Engineering, Virginia Polytechnic Institute & State University, 252 pp. 1996. The comparison is therefore not between two methods that claim optimal or near optimal results. It is offered nonetheless because the sub-optimality of results is a valid trade-off with numerical complexity.

The third allocation method implemented was the cascaded generalized inverse (CGI). This algorithm began with the pseudoinverse solution as described above. If this solution resulted in over-saturated controls, those controls were set to their corresponding limits and removed from the problem. Removal from the problem was accomplished by subtracting the contribution of the saturated controls from the desired objective, removing the appropriate columns from the B matrix, and repeating the pseudoinverse solution with the remaining controls. This process was continued until either no more controls were over-saturated, or the number of remaining controls was fewer than three. In the latter case a least squares solution was obtained for the residual objective using the remaining controls. Uniformly random B matrices and desired objectives were generated for numbers of controls ranging from four to 500. For all allocation methods except CGI, the magnitudes of the desired objectives was of made sufficiently large to assure they were unattainable. For the CGI method the desired objective was scaled to the maximum attainable (preserving direction). The desired objective presented to the CGI algorithm was increased to 110% of maximum attainable for some of the results to be presented. The values in the B matrices were within the range ±1. Control limits were set at ±1 for each case. Each case examined consisted of 100 different problems for which statistics were evaluated. The statistics consisted of maximum and mean of the number of floating-point operations required for the edge searching, facet-searching, and CGI algorithms.

Errors for the edge-searching algorithm were defined as those cases in which the algorithm returned an approximate solution. The number of such errors was accumulated for each case. The magnitude of the objective that resulted from the approximate solution was compared, where available, with that of the optimal solution; the mean and maximum percentage of error was calculated for each case. The number of floating-point operations required for the pseudoinverse was constant for a given number of controls. The facet-searching algorithm was not employed for numbers of controls greater than twenty because of the very high computation times required. The results for numbers of controls from four to twenty is of primary interest in aircraft flight control applications, and those results are presented separately.

Data for the error in the pseudoinverse and the CGI algorithm solutions were determined by comparison with the optimal (facet-search algorithm) for numbers of controls less than or equal to 20. For numbers of controls greater than 20, the results of the edge-search algorithm were taken as optimal for determination of the errors. Errors were calculated as the magnitude of the difference between the maximum attainable desired objective vector (preserving direction) and that returned by the CGI algorithm, divided by the magnitude of the maximum desired objective vector.

Results

Figure 8:
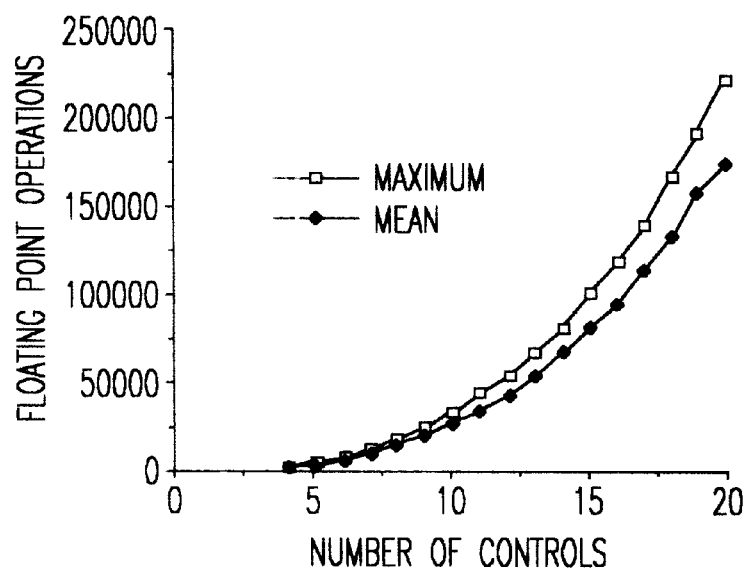
FIG. 8 is a graph showing required floating-point operations for a facet search.

Four to Twenty Controls: Required Floating-Point Operations. FIG. 8 shows the number of required floating point operations for the facet-searching algorithm for cases of numbers of controls ranging from four to twenty. The number of floating point operations required were fit with quadratic polynomials with least-square errors and yielded $n_{FLops}=5122-807(m-4)+712(m-4)^2$ for the mean, and $n_{FLops}=6968-1244(m-4)+901(m-4)^2$ for the maximum statistic. Both curve fits had the same error, $r^2=0.999$.

Figure 9:
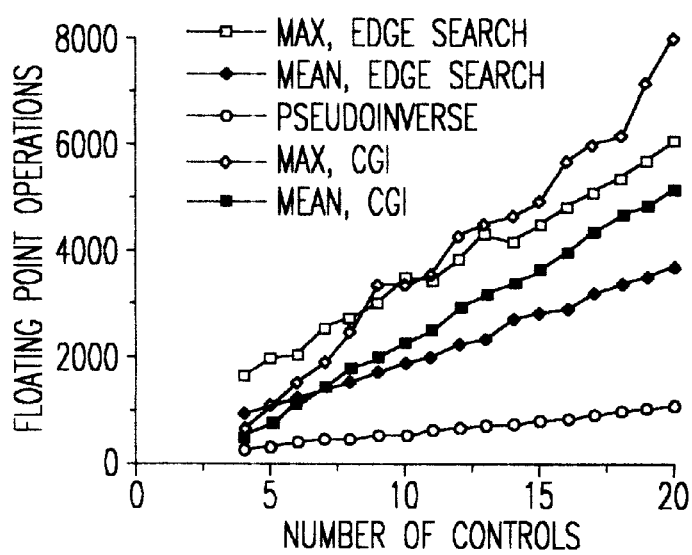
FIG. 9 is a graph showing required floating-point operations for other methods.

FIG. 9 shows the number of required floating point operations for the other allocation methods for cases of numbers of controls ranging from four to twenty, using a maximum of five bisections for the edge-search algorithm. The pseudoinverse data were fit perfectly with $n_{FLops}=307+48(m-4)$. The edge-searching algorithm data were fit with straight lines given by $n_{FLops}=904+172(m-4)$ for the mean ($r^2=0.996$) and $n_{FLops}=1701+264(m-4)(r^2=0.994)$ for the maximum statistic. The CGI algorithm data (with desired objectives 100% of maximum attainable) were fit with straight lines given by for the mean ($r^2=0.999$), and $n_{FLops}=746+414(m-4)(r^2=0.984)$ for the maximum statistic. Based on these curve fits the maximum floating point operations required for the edge-searching and CGI algorithms coincided at around ten or eleven controls, above which the edge-searching algorithm required fewer operations. In the worst cases the edge-searching algorithm requirements increased 5.5 times faster than the pseudoinverse, and the CGI algorithm requirements increased 1.6 times faster than the edge-searching algorithm.

Figure 10:
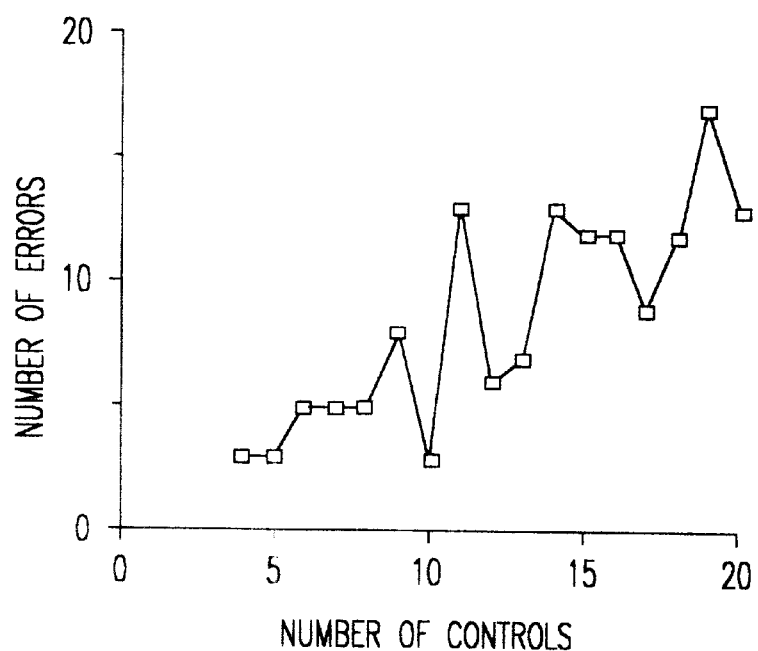
FIG. 10 is a graph plotting number of errors versus number of controls.
Figure 11:
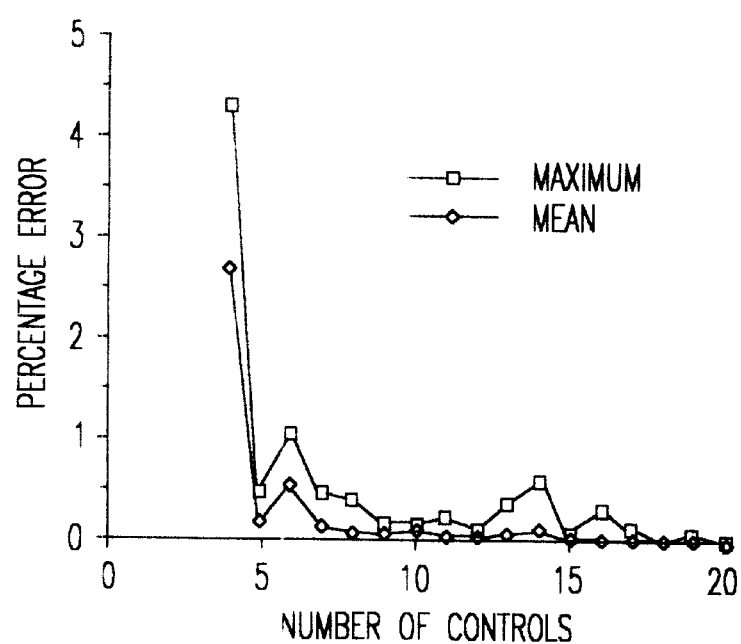
FIG. 11 is a graph plotting percentage error versus number of controls.

Four to Twenty Controls: Errors. FIG. 10 shows the number of errors encountered using the edge-searching algorithm for each case of 100 problems (with five bisections maximum). The number of errors ranged from three at the cases of four, five, and ten controls, to 17 for the case of 19 controls. The percentage error (compared to the optimal), mean and maximum for the number of errors in FIG. 10 is shown in FIG. 11. The percentage error generally declined as the number of controls is increased. The greatest maximum error occurred in one of the three errors associated with the case of four controls and was 4.4%; the least maximum error occurred in one of the twelve errors associated with the case of 18 controls and was 0.034%.

Figure 12:
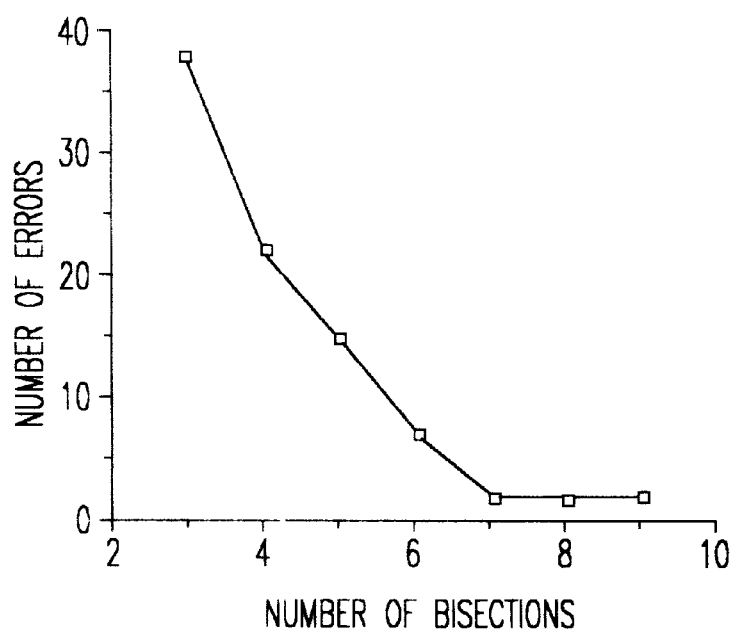
FIG. 12 is a graph plotting number of errors versus number of bisections.

FIG. 12 explores the relationship between the number of edge-searching errors and the number of bisections for the case of fifteen controls. Each point represents 100 problems with the same number of maximum permitted bisections. The number of errors was greatest at three bisections and is 38. The number of errors decreased monotonically as the maximum number of permitted bisections were increased, and reached a minimum of two with seven bisections. The number of errors then remained constant for eight and nine bisections.

Figure 13:
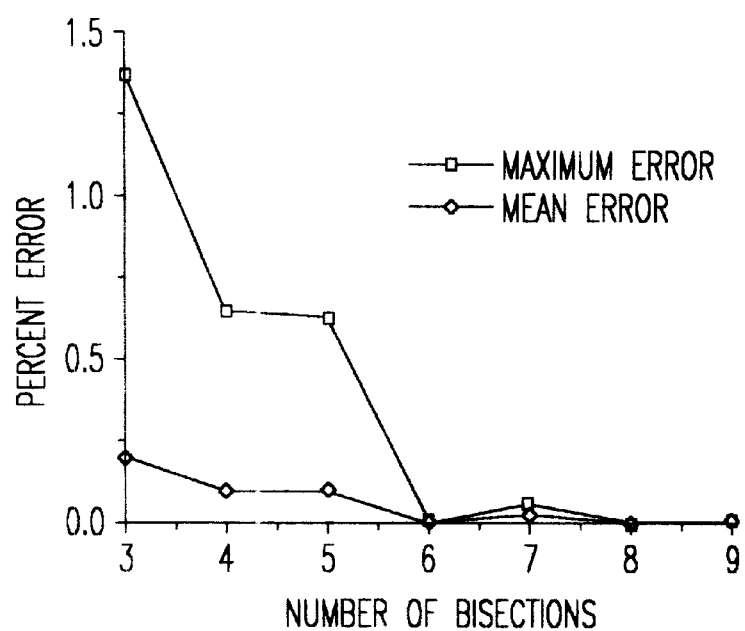
FIG. 13 is a graph plotting percentage of error versus number of bisections.
Figure 14:
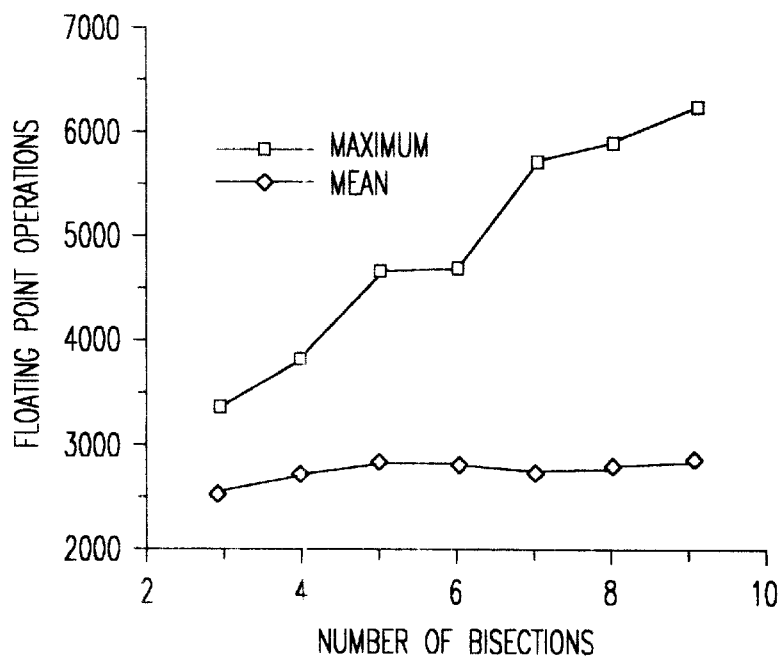
FIG. 14 is a graph plotting floating-point operations versus number of bisections.

The percentages of error for the same results as given in FIG. 12 are shown in FIG. 13. The greatest maximum and mean errors both occurred at three bisections and were 1.37% and 0.202%, respectively. Both the maximum and mean error statistics decreased as the number of bisections was increased until six bisections was reached. At that point the maximum of the seven errors that occurred was 0.01% and the mean was 0.005%. Both statistics increased roughly six-fold from six to seven bisections. As the number of bisections was further increased, the error statistics returned to a level at or less than that seen at six bisections. The number of floating point operations required to solve the fifteen-control case is shown in FIG. 14, corresponding to the results in FIGS. 12 and 13. The maximum number of floating point operations varied with the number of bisections according to $n_{Flops}=3464+497(n_{Bisections}-4)(r^2=0.966)$. The mean number of floating point operations was minimum at three bisections (2551) and increased by 12.5% to a value of 2869 operations at six bisections. The mean number of operations then decreased somewhat to 2762 operations at seven bisections, then increased again to 2895 operations at nine bisections.

Figure 15:
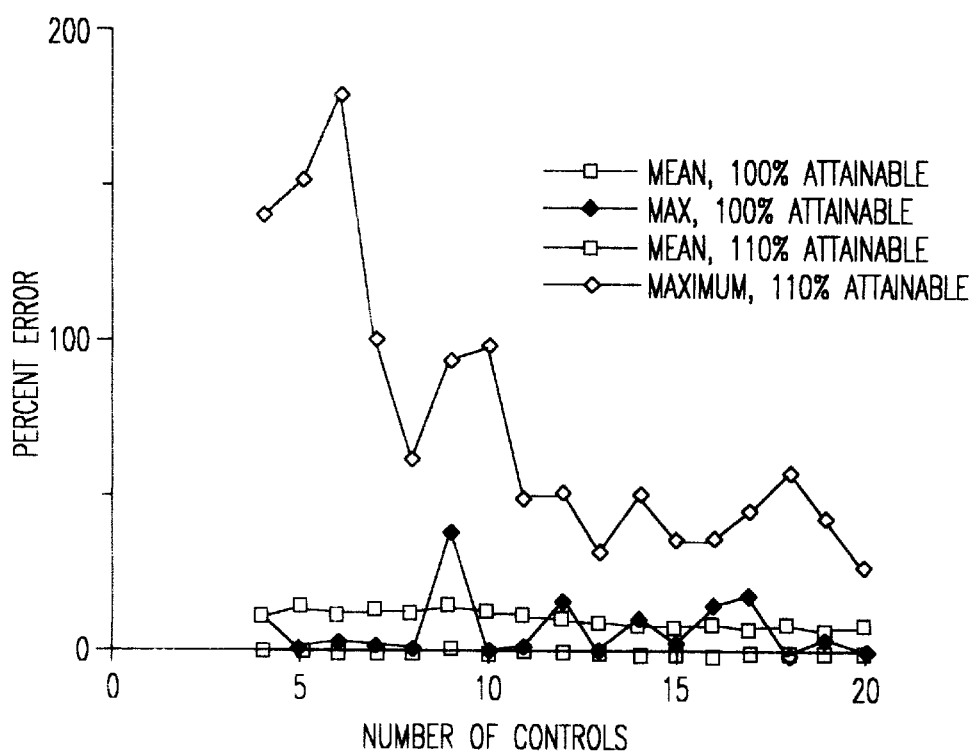
FIG. 15 is a graph plotting percentage of error versus number of controls for the CGI method (100% maximum attainable)

FIG. 15 shows the mean and maximum error for the CGI allocation method for numbers of controls from four to twenty, for the cases in which the desired objectives was 100% and 110% of maximum attainable. The mean error was less than 1.0% for the 100% attainable cases, and was less than 15% for the 110% attainable cases. For the 100% attainable cases, the greatest maximum error was nearly 39% at nine controls, and the least maximum error was 0.38% at ten controls. For the 110% attainable cases, the greatest maximum error was 180% at six controls, and the least maximum error was 27% at twenty controls. All errors, maximum and mean, showed some tendency to diminish as the number of controls increased.

Figure 16:
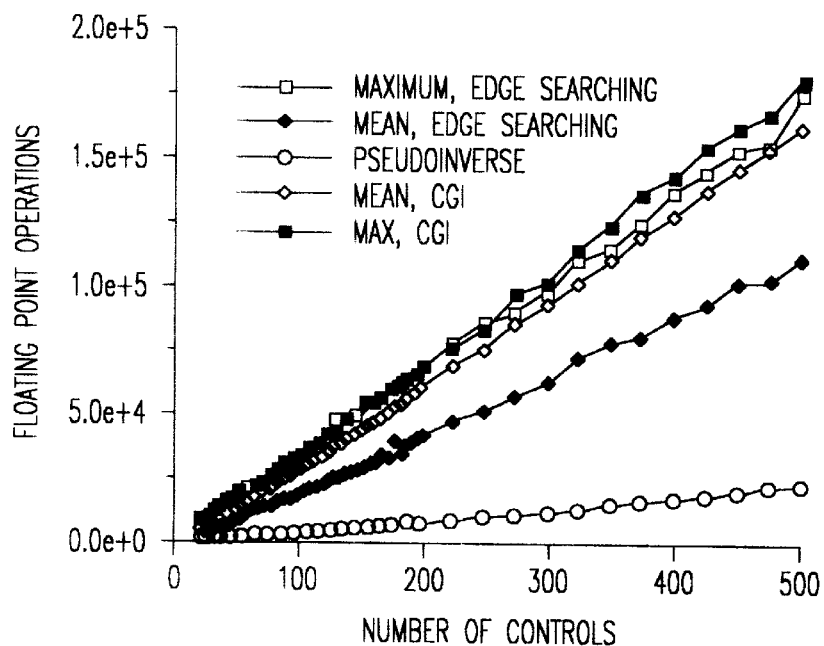
FIG. 16 is a graph plotting required floating-point operations for 21–500 controls.

Many More Controls: Required Floating Point Operations. FIG. 16 shows the number of required floating point operations for cases of numbers of controls ranging from 21 to 500, using a maximum of eight bisections for the edge-searching algorithm. The number of controls was increased by one from 21 to 55 controls, then by five from 55 to 200 controls, and finally by 25 from 200 to 500 controls. The maximum number of floating point operations required for the edge-search algorithm increased according to $n_{Flops}=7699+338(m-21)$, and its mean according to $n_{Flops}=2852+223(m-21)(r^2=0.998$ for each The maximum number of floating point operations required for the CGI algorithm (with desired objectives 100% of maximum attainable) increased according to $n_{Flops}=6165+359(m-21)$, and its mean according to $n_{Flops}=3972+325(m-21)(r^2=0.999$ for each). The number of floating point operations required for the pseudoinverse increased according to $n_{Flops}=1119+48(m-21)$. In the worst cases, the edge-searching algorithm requirements increased seven times faster than the pseudoinverse, and the CGI algorithm requirements increased 1.06 times faster than the edge-searching algorithm.

Figure 17:
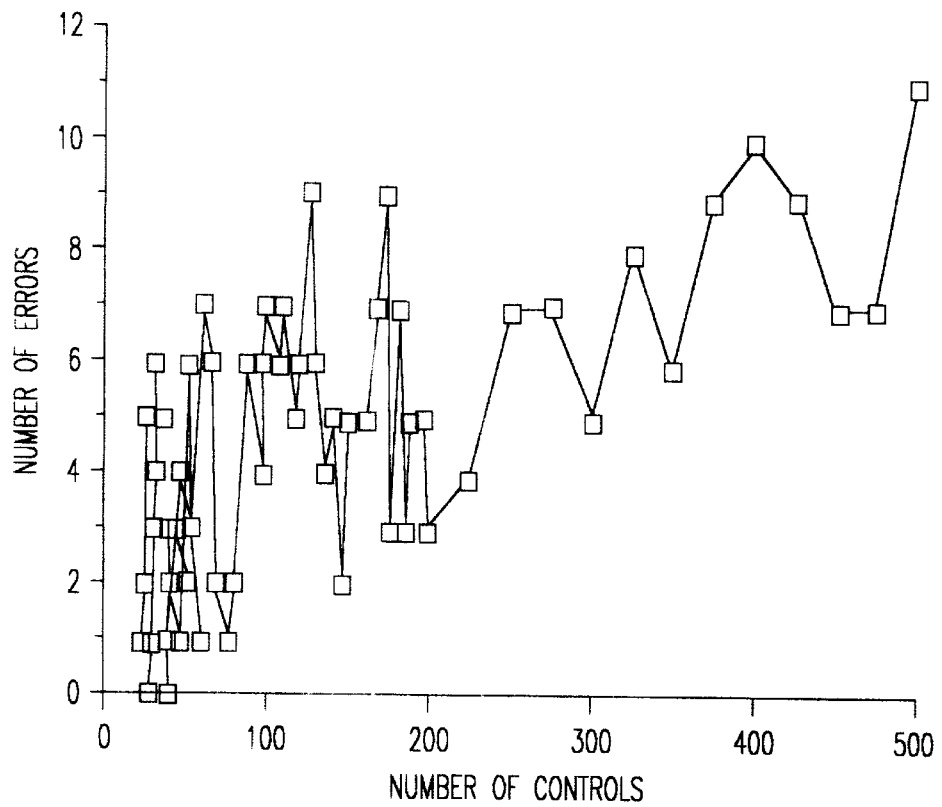
FIG. 17 is a graph plotting number of errors versus number of controls for edge-searching, 21–500 controls.

Many More Controls: Errors. The number of errors that resulted from each of the cases presented in FIG. 16 is shown in FIG. 17. The number of errors showed a general increasing trend throughout, although there are several exceptions to this generalization. No errors at all were returned for the cases 25 and 37. In no case was the number of errors greater than eleven, which was encountered once (500 controls).

Determination of the percentage error for the edge-searching algorithm for numbers of controls greater than 20 was examined by spot-checking. Cases of 50, 100, 150, 200, 250, and 300 controls were evaluated using the bisecting edge-searching algorithm, and repeated for each with random problems until a non-optimal solution was returned. The facet search was then employed for that problem to determine the optimal solution. Thus each result is for a sample of one. The results were as follows: 50 controls, 0.00362% error; 100 controls, 0.00107% error; 150 controls, 0.000146% error; 200 controls, 5.52e–05% error; 250 controls, 0.000116% error; and 300 controls, 0.000157% error.

Figure 18:
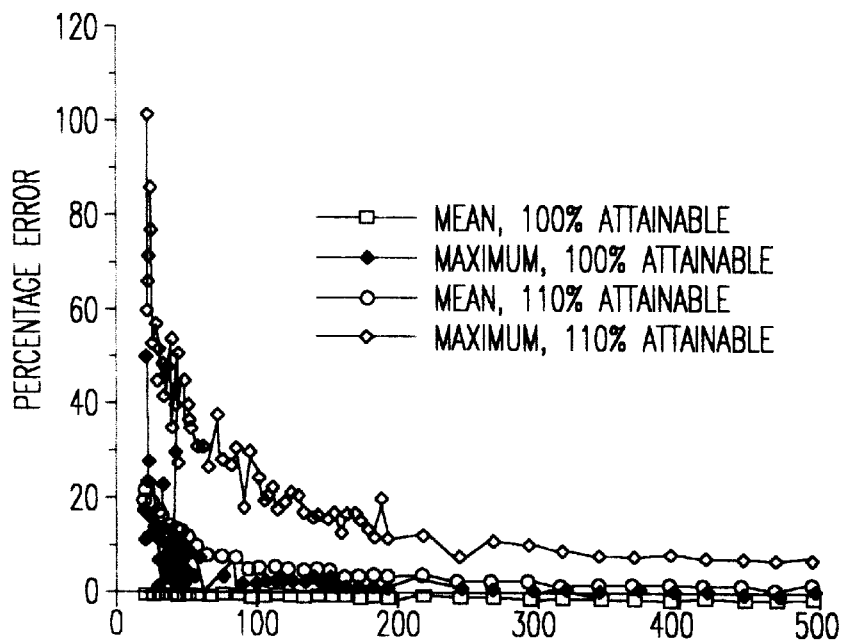
FIG. 18 is a graph plotting percentage error versus number of controls for the CGI method, 21–500 controls.

The mean and maximum CGI errors for numbers of controls from 21 through 500 are shown in FIG. 18. Data axe shown for the cases of 100% and 110% of maximum attainable objective presented to the algorithm. Each of the statistics showed a tendency to decrease as the number of controls increased. For 100% maximum attainable objective, the mean was greatest at 21 controls (0.225%) and least at 475 controls (0.000017%), and the maximum was greatest at 21 controls (19.4%) and least at 475 controls (0.00045%). For 110% maximum attainable objective, the mean was greatest at 22 controls (7.76%) and least at 425 controls (1–39%), and the maximum was greatest at 23 controls (39%) and least at 475 controls (3–66%).

Figure 19:
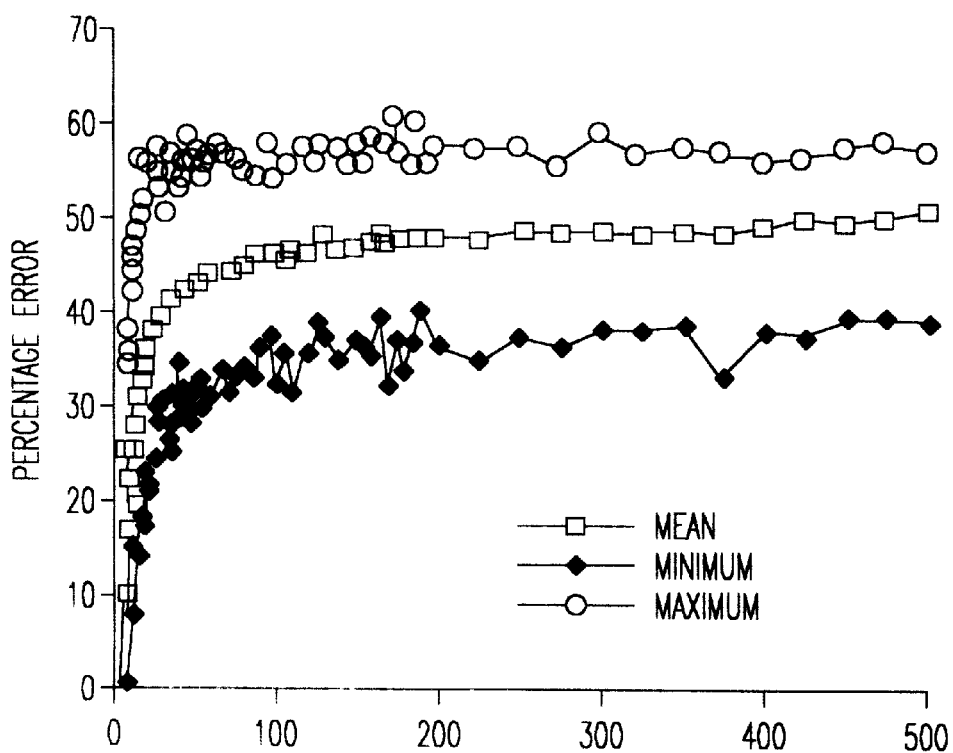
FIG. 19 is a graph plotting percentage error versus number of controls for pseudoinverse.

The minimum, mean, and maximum pseudoinverse errors for numbers of controls from 4 through 500 are shown in FIG. 19. All three statistics show the same trend, increasing rapidly through the data for 50 controls, then increasing less rapidly through 500 controls. The minimum and maximum errors showed wide variance relative to the mean error, which appears relatively smooth. The mean error was 38% at 20 controls, 44% at 50 controls, and thereafter gradually rose to 50% at 500 controls. The minimum error was below 1% at four and five controls, below 10% at seven and eight controls, and everywhere else greater than 10%. The trend for minimum error approached 40% for numbers of controls greater than ten. The greatest maximum error was just over 60% at 175 controls, and appeared to be tending toward this value at greater numbers of controls.

Discussion

The quadratic increase of floating point operations required vs. number of controls for the facet search algorithm was anticipated, since the number of facets in the general case with m controls is given by 2 m(m−1). The variability in the number of floating point operations required for the farcet search algorithms in the worst case is explained as follows: Facets are generated in pairs, corresponding to complementary (minimum-maximum) settings of the fixed controls associated with each facet. After a facet is generated, its complementary facet is easily calculated by changing controls at their minimum deflections to maximum, and vice-versa. In testing the facets, the intersection of ell with the plane of the facet is characterized as a linear combination of three vectors consisting of one vertex and two edges from that vertex. This characterization requires the inversion of a 2×2 matrix. The sign of the factor associated with the vertex is a first test of whether the facet is a candidate for intersection (positive sign is required). If this sign is positive, then that associated with the complementary facet is negative and it need not be tested. If the sign is negative, however, then the complementary facet must be tested, requiring another matrix inversion. It may be argued that in the true worst case every facet tested would require the testing of its complementary facet, but this is a highly unlikely case, roughly equivalent to the occurrence of heads turning up in m(m−1) coin tosses.

The linear increase of floating point operations required vs. number of controls for the bisecting edge search algorithm is similarly explained. At each step the two-dimensional problem is solved, and the number of edges of the two-dimensional $\Phi$ is 2 m. Once the maximum number of permissible bisections is set, the order of computational complexity is set. The variability in the number of required floating point operations is related to the number of edge determinations required between bisections. For similar reasons, it is difficult to establish a worst-case requirement, since the number of bisections as well as the number of steps between bisections may vary.

The linear increase of floating point operations required vs. number of controls for the pseudoinverse solution is a simple consequence of the fact that it is a linear solution to a linear problem, and there is no variability. Similar reasoning applies to the results shown for the CGI method. Fewer floating point operations may be expected for the CGI method for desired objectives that are greater than or less than maximum attainable. The two extremes that justify this assertion are the case in which no controls are over-saturated on the first inversion, in which case the CGI and pseudoinverse solutions are the same; and the case in which all controls are over-saturated i, on the first inversion, in which case no controls are left over for subsequent inversions.

Understanding of the behavior of the size of the errors associated with the bisecting edge-search algorithm is best achieved by considering the solid angles at the origin that are subtended by a given facet. In general, the more facets there are, the smaller will be the angles. When there are few controls the size of these angles is generally larger, and any erroneous solution will consist of two edges that are "far apart". The converse is likely true, that with a large number of controls the two erroneous edges will be closer. Unfortunately, this conjecture does not explain why the number of errors does not increase more rapidly with the number of controls than it does. It would intuitively seem that if the two desired edges are separated by small angles, then very small angles of rotation would be required to resolve them. This apparent contradiction remains an open question, but one that will not be pursued too vigorously since the observed behavior is considered advantageous. The rationale for the maximum number of bisections used to generate the results was as follows: For numbers of controls from four to twenty, the facet search algorithm was reasonably fast, and thus provided optimal solutions to calculate errors in other methods. Five bisections for the edge-searching algorithm typically produced errors less than 1%, which is reasonable for flight control applications. For greater numbers of controls, the facet-search algorithm began to take a prohibitive amount of time to calculate. Therefore, the number of bisections was increased to eight for the edge-searching algorithm in order to generate very near optimal solutions (within approximately 0.005%) for use in calculating errors in the pseudoinverse and CGI algorithms.

The pseudoinverse solution was shown to produce poor results with respect to optimality. Other closed-form generalized inverses are possible but even the "best" generalized inverse (which requires knowledge of the optimal solution to calculate), with respect to optimality is still poor. A typical flight control application with seven controls has been considered. With great difficulty, a collection of 48 generalized inverses (which required knowledge of the optimal solution to calculate) were determined that collectively returned admissible solutions over 84.6% of the volume of at best. This result is roughly equivalent to a 5% error in magnitude uniformly over all the optimal solutions which is greater than the worst error observed in any case, and several orders of magnitude worse than the typical error, using bisecting edge searching. Within the range of numbers of controls of interest in flight control applications (4–20 controls), the error behavior associated with the CGI method, as implemented herein, makes its use problematic. If the desired objective is in fact attainable then the CGI solution has small mean error, but occasionally exhibits quite large errors. If the desired objective is not attainable by as little as 10% greater than attainable, then the mean error becomes unacceptably large. The mean error may be expected to range from 7% to 15%, with maximum errors greater than 175%, for desired moments 110% greater in magnitude than are attainable. The problem is, of course, that the maximum attainable objective in a particular direction is not known to the CGI algorithm. There are possible means of restricting the desired objectives to only those that are attainable, such as fitting an ellipsoid to the minimum and maximum attainable objectives along each of the axes, but none have been reported in the literature.

Conclusions

The method of bisecting edge searching is clearly superior, with respect to computational requirements, to that of facet searching since the former increases in computational complexity linearly with the number of controls while the latter increases quadratically. With respect to optimality of the solutions afforded by these two methods, facet searching is superior since it always returns the optimal solution. However, the frequency of occurrence of sub optimal solutions associated with bisecting edge searching is not great (typically less than 10% of cases examined), and the magnitude of the error, when encountered, is small.

The method of bisecting edge searching is clearly inferior, with respect to computational requirements, to that of the pseudoinverse. While both methods increase in computational complexity linearly with the number of controls, the former increases at a rate that is from three to seven times greater (depending on the number of bisections used) than that required for the pseudoinverse. With respect to optimality of the solutions afforded by these two methods, it was shown that the bisecting edge-searching algorithm is greatly superior.

The method of bisecting edge searching is comparable, with respect to computational requirements, to the (CGI) solutions. Both methods increase in computational complexity linearly with the number of controls, and the former increases at a slightly lower rate than that required for the (CGI). With respect to optimality of the solutions afforded by these two methods, it was shown that the bisecting edge-searching algorithm is greatly superior.

2. The Second Preferred Embodiment

The second preferred embodiment of the method of the present invention addresses the following problem statement:

Problem Statement

The problem statement involves a linear map $B_3$ from $\Re^m \to \Re^3$, $y_3 = B_3 u$, where $u \in \Re^m$ are the controls with effectiveness $B_3$ in generating the objectives $y_3 \in \Re^3$. The subset of admissible controls is $\Omega$, $u \in \Omega \Leftrightarrow u_{Min,i} \leq u_i \leq u_{Max,i}$, where $i = 1 \ldots m$. The subset of attainable objectives $\Phi_3$ is the image of $\Omega$, $y_3 = B_3 u \in \Phi_3 \Leftrightarrow u \in \Omega$. The three-objective optimal control allocation problem is, given $B_3$, $\Omega$, and a half-line $l_3$ in the direction of some arbitrary desired objective $y_{3d}$, find the intersection of $l$ with $\partial(\Phi_3)$, the convex hull of $\Phi_3$.

Method

The method of the present invention in accordance with the second preferred embodiment includes identifying vertices and edges of $\partial(\Phi_3)$. Certain geometrical properties of these vertices and edges are used to identify those that are in the vicinity of the solution $p_3$. Those vertices and edges are then systematically collected to form a set of vertices and edges that are part of the facet that contains the solution $p_3$. If the solution facet is determined in this manner, the problem is solved. Otherwise, the set of vertices and edges are combined in a manner that permits calculation of an approximate solution.

It is assumed, without loss of generality, that the desired objective $y_{3d}$, is in the direction of the $y_1$-axis, or $\hat{y}^T_{3d} = \hat{e}_{3,1} = \{1,0,0\}$. For any arbitrary $y_{3d} \neq 0$, there is a (non-unique) nonsingular transformation of the problem that satisfies this condition. Then, $l_3 = \{\alpha_3, 0, 0\}$, $\alpha_3 \geq 0$.

Figure 20A:
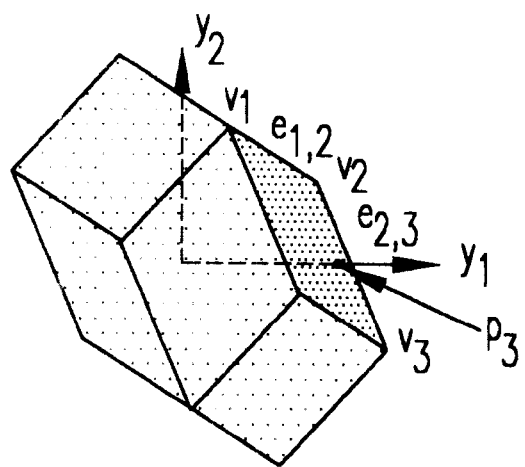
FIG. 20(a) is a diagram showing a solution space $\Phi_3$, with $y_3$ oriented directly out of the page and the optimal solution $p_3$.

The first part of the method, identifying vertices and edges $\partial(\Phi_3)$, is done by examining a two-dimensional projection of $\Phi_3$, that projection denoted $\Phi_2$. The motivation for examining $\Phi_2$ is two-fold: (1) The convex hull $\partial(\Phi_2)$ is the projection of $\partial(\Phi_3)$, so that vertices and edges of $\partial(\Phi_2)$ are in a one-to-one correspondence with some of the vertices and edges of $\partial(\Phi_3)$; and (2) The two dimensional problem is easy to solve. FIGS. 20(a) and (b) depict this relationship.

FIG. 20(a) shows a solution space $\Phi_3$, with $y_3$ oriented directly out of the page, and the optimal solution $p_3$.

Figure 20B:
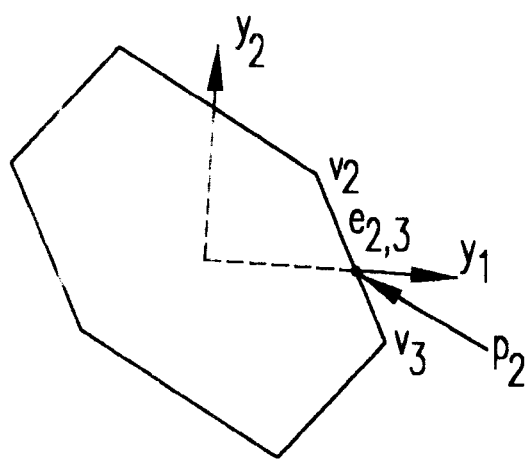
FIG. 20(b) shows the corresponding $\Phi_2$, and its optimal solution $p_2$.

FIG. 20(b) shows the corresponding $\Phi_2$, and its optimal solution $p_2$. Clearly, the edge that contains $p_2$ is one of the four edges that define the facet that contains $p_3$. In the particular case shown, the solution of the two-dimensional problem yields information about the solution to the three-dimensional problem.

Figure 21A:
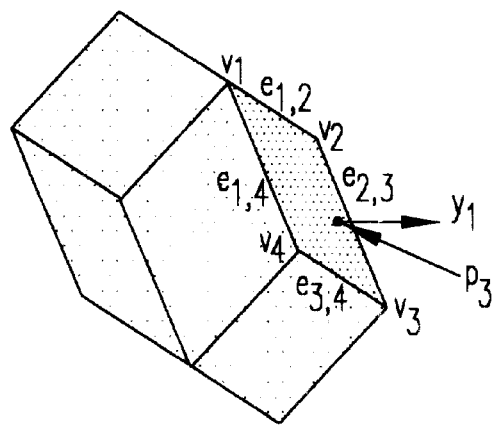
FIGS. 21(a)–(d) show how other edges may be determined in accordance with the present invention.

The identification of a single edge of the solution facet of $\Phi_3$ is insufficient to uniquely determine that facet. FIGS. 21(a)–(d) show how other edges may be determined. FIG. 21(a) is the same as FIG. 20(a) with several vertices and edges identified. Axis $y_2$ is understood to be vertically upward, and $y_3$ is directly out of the page in each figure. As before, $l_3$ is coincident with $y_1$. The solution point $p_3$ is identified in (a), along with the four vertices $v_i$ and edges $e_{i,j}$ of the solution facet.

Figure 21B:
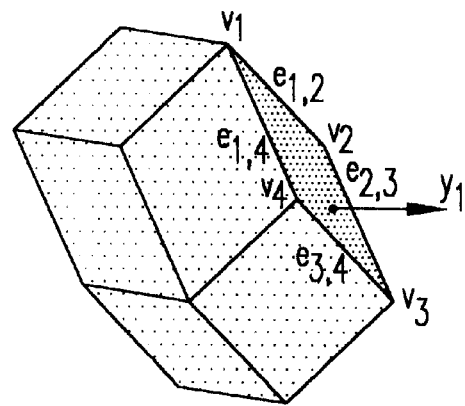

In FIG. 21(a), solving the two-dimensional problem will identify edge $e_{2,3}$. To identify other edges, $\Phi_3$ is rotated about $y_1$, and $y_2$-$y_3$ redefined such that $y_3$ is always normal to the projection. In the figure, the rotation about $y_1$ is negative as conventionally defined, so that the top of the figure is receding from FIGS. 21(a) through (d). In FIGS. 21(b) and (c), the two-dimensional solution remains $e_{2,3}$, but the solution facet becomes more nearly "edge-on" to the viewpoint along $y_3$. From FIGS. 21(c) to (d), the solution facet proceeds to the "back" of the figure, and edge $e_{3,4}$ becomes the edge containing the solution to the two-dimensional problem. The two edges $e_{2,3}$ and $e_{3,4}$ uniquely determine the solution facet, and the three-dimensional problem is solved.

Figure 21C:
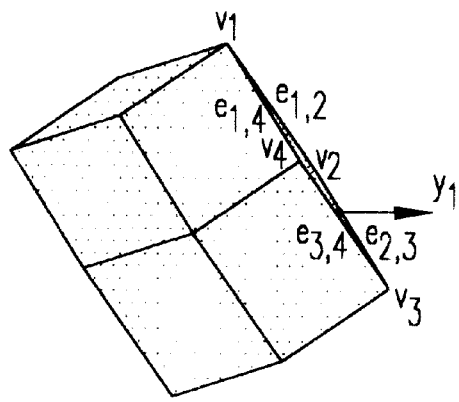
Figure 21D:
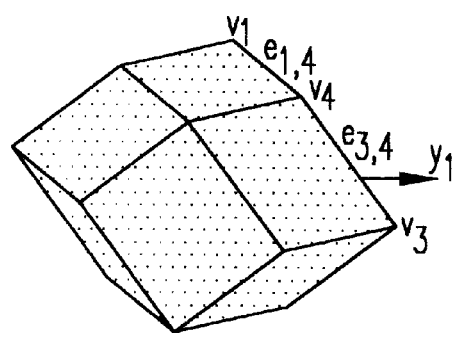

Various geometrical features of the vertices and edges of $\Phi_2$ and $\Phi_3$ will be used to help figure out which edges are part of the solution. In FIG. 21(a), viewed as $\Phi_2$, when traversing the edges around the figure, $v_2$ is "above" $l_3$ (positive $y_2$ component) and $v_3$ is "below" that line. The above-below feature may be used to identify the edge without actually solving for $p_2$. In FIGS. 21(a)–(c), viewed as $\Phi_3$, the identified edge $e_{2,3}$ is "behind" $l_3$ (has a negative $y_3$ component when its $y_2$ component is zero), and in FIG. 2(d) $e_{3,4}$ is "in front of $l_3$. These relationships are simplified by the transformation of the problem to align $y_{3d}$, with the $y_1$-axis, and this is the primary motivation for doing so. The qualities of in-frontness and behindness will play a role in determining which edges are candidate members of the solution facet.

It should be clear from FIG. 21 that, when the solution facet is exactly "edge-on" to $y_1$-$y_2$, infinitesimal rotations in either direction about $y_1$ will alternatively present $e_{2,3}$ and $e_{3,4}$ as the solution edge to the two-dimensional problem. Thus, two edges—one in front of and one behind $l_3$—are more likely part of the solution facet if the angle of rotation about $y_1$ that separates them is "small".

It is natural at this point to ask if there is always a rotation that places the solution facet edge-on. The answer is yes. Denote the normal vector to the solution facet in $\Re^3$ as n. The facet will be edge-on when n lies in the plane $y_1$-$y_2$, or when its $y_3$ component is zero. It is easy to verify that for a transformation $T(\theta)$:

$$T(\theta) = \begin{bmatrix} 1 & 0 & 0 \\ 0 & \cos\theta & \sin\theta \\ 0 & -\sin\theta & \cos\theta \end{bmatrix}$$

there is always some $\theta_n$ such that the $y_3$ component of $T(\theta)n$ is zero.

Summary. The method of the second preferred embodiment of the present invention, thus, solves the three-dimensional optimal allocation problem as follows:

1. Transform the problem to align $y_{3d}$ with $y_1$.
2. Find the edge of $\Phi_2$ that crosses $l_2$.
3. Perform systematic rotations $T(\theta)$ about $y_1$, repeating step 2 until step 4 is satisfied.
4. When two edges are found, one in front of and the other behind $l_3$, separated by a suitably small rotation angle, form the union of the two edges (see section below for union operations).
   (a) If the union is a facet, and $p_3$ is on that facet, solve the problem.
   (b) If the union is a facet, and $p_3$ is not on that facet, either approximate the solution or return to step 3.
   (c) If the two edges do not form a facet, either approximate the solution or return to step 3.

An Algebra for Control Allocation

It is well known that the subset of attainable moments $\Phi_n$, a convex polytope, is bounded by faces that are images of $(n-1)$-dimensional objects in $\Omega_n$. Each face may be thought of as the structure that results from varying $(n-1)$ controls over their ranges of admissible values while all other controls are fixed at some combination of minimum and maximum values. Each of the $(n-1)$ dimensional faces are themselves convex polytopes, bounded by polytopes of dimension one less than the face. This geometry continues down to the minimal nonempty face, the 0-dimensional vertices. For the three-dimensional problem being considered, n=3 and $\Phi_3$ is bounded by 2-dimensional facets.

Object-Notation. Vertices, edges, facets, and higher-dimensional objects $\Re^m$ are conveniently denoted in object-notation by an m-vector $o^0$ (with the superscript "0" signifying that object-notation is employed), defined as follows: If on the object a control is at its maximum, the integer 1 is assigned; if it is at its minimum, –1 is assigned; and if it is free to vary on the object, 0 is assigned. Thus, a vertex would be represented by a vector consisting only of –1's and +1's, an edge would have one 0, a facet two 0's, and so on. The dimension of an object $o^0$, $\dim(o^0)$, is the number of 0's in its representation in object-notation.

Union. Given any two objects thus represented, it is easy to find their union, which is the smallest object that contains the two. The two objects are compared on an element-by-element basis. If the corresponding elements of the first and second objects are different, a 0 is assigned to the result, otherwise their common value is assigned. Given $o^0_1$ and $o^0_2$, for $i=i \ldots m$:

| $o^0_1(i) \rightarrow$ $o^0_2(i) \downarrow$ | –1 | 0 | 1 |
|---|---|---|---|
| –1 | –1 | 0 | 0 |
| 0 | 0 | 0 | 0 |
| 1 | 0 | 0 | 1 |

For an example of the union operation, consider five controls and the three objects $a^0$, $b^0$, and $c^0$, with $a^0 = \{1\ 0\ -1\ 1\ 1\}^T$ $b^0 = \{-1\ 1\ -1\ 1\ -1\}^T$ $c^0 = \{1\ 1\ -1\ 1\ 0\}^T$ Objects $a^0$ and $c^0$ are edges (one 0), and object $b^0$ is a vertex (no 0's). Moreover, we have $a^0 \cup b^0 = \{0\ 0\ -1\ 1\ 0\}^T$ $a^0 \cup c^0 = \{1\ 0\ -1\ 1\ 0\}^T$ $b^0 \cup c^0 = \{0\ 1\ -1\ 1\ 0\}^T$ From this process, we may easily establish that the smallest object that contains both $b^0$ and $c^0$ is also 2-dimensional.

Application to $\Phi_3$. While this object-notation is defined in terms of the m-dimensional set of admissible control deflections $\Omega$, it may be used to describe objects in the lower dimensional sets of attainable objectives. These lower-dimensional objects are simply the images, through the linear transformations $B_3$ (for $\Phi_3$) or $B_2$ (for $\Phi_2$), of all points on the object in m-space. Thus, when we speak of an edge in $\Phi_3$ using this object-notation, it is understood that the image of the corresponding object in $\Omega$.

If we desire the coordinates of an object in $\Phi_3$ (n=2 or 3), then we convert the object-notation to a control vector: From the object-notation, actual minimum/maximum limits are assigned to the non-zero elements. As for the 0 elements, the vertices of the object in $\Phi_n$ are determined by setting all combinations of minima and maxima of the corresponding controls, then multiplying the resulting control vectors by $B_3$. Alternatively, some specific values of the controls associated with the 0 elements, within their admissible ranges, may be assigned. Multiplying this control vector by $B_n$ yields a general point on the object in $\Phi_n$.

With respect to notation, we use the superscript u to denote an object in $\Re^m$ with actual control deflections in place of the integers. This is notional, of course, for those controls that axe given by 0, and the interpretation is that that control ranges from its minimum to its maximum deflection. Thus, $o^u$ is $o^0$ with actual deflections. The image of $o^u$ 0 in $\Re^n$ is loosely $B_n \cdot o^u$, which is understood to map whole ranges of control deflections if required. We denote these images with the superscript y.

Note that all objects defined by object-notation are on the convex hull of $\Omega$ with one exception. The exception is the object consisting of all 0's, which represents the entire set of admissible controls. A single non-zero entry denotes one of the $(m-1)$-dimensional hyper-facets of $\Omega$. Smaller dimensional objects are analogous to vertices or edges on a three-dimensional cube: They do not constitute the entire boundary (convex hull) of the cube, but they are all on that boundary.

Not all of the objects defined by object-notation in $\Phi_n$ are on $\partial(\Phi_n)$. For a 3-dimensional $\Phi_3$, only $(n-1)$ or 2-dimensional and smaller objects—those with 2 or fewer 0's in object-notation—can exist on the boundary $\partial(\Phi_3)$. Demonstrably, not all objects in $\Omega$ that are of acceptable dimension will map to $\partial(\Phi_3)$.

This algebra is used to determine whether two edges have as their union a facet that contains the intersection with $l_3$.

Details of Method

Initial Transformation. The first step is to transform the problem to align $y_{3d}$ with $y_1$. There are many ways to derive such a transformation; the method shown here is reasonably efficient, and easily generalizes to higher dimensional problems.

Let $$y_{3_d} = \begin{Bmatrix} y_{1_d} \\ y_{2_d} \\ y_{3_d} \end{Bmatrix}$$

Assume that $y_{3d}$ has been normalized, $\|y_{3d}\|_2 = 1$. Consider a transformation G such that $$Gy_{3_d} = \begin{Bmatrix} 1 \\ 0 \\ 0 \end{Bmatrix}$$

We assume that none of $y_{id}$, i=1 ... 3 are zero and relegate those problems to the special category cases (two zero elements just requires possibly a shuffling of rows, and on zero element requires possibly a shuffling with subsequent solution of a trivial 2×2 problem). With that assumption, let $$G = \begin{bmatrix} y_{1_d} & y_{2_d} & y_{3_d} \\ 0 & g_{22} & g_{23} \\ g_{31} & g_{32} & g_{33} \end{bmatrix}$$

Take all square roots to be positive. Constructively, the elements $g_{ij}$ may be determined according to:

$g_{31} = \sqrt{1 - y_{1_d}^2}$ $g_{32} = -y_{1_d} y_{2_d}/g_{31}$ $g_{33} = -y_{1_d} y_{3_d}/g_{31}$ $g_{22} = -\sqrt{1 - y_{2_d}^2 - g_{32}^2}$ $g_{23} = -(y_{2_d} y_{3_d} + g_{32} g_{33})/g_{22}$ It is easy to verify that this algorithm yields a unitary G and $Gy_{3d} = \{1, 0, 0\}^T$. To ensure $|G| = +1$, the second (or third) row is multiplied by $\text{sgn}(y_{3d})$, the sign of $y_{3d}$.

In subsequent discussions, any reference to a $B_3$ matrix is taken to mean the original matrix, say $B_{3Orig}$, left-multiplied by G:

$B_3 = G\ B_{3Orig}$

Then, if u solves $B_3 u = \{1, 0, 0\}^T$, it also solves $B_{3Orig} u = y_{3d}$, i.e., $B_3 u = \{1,0,0\}^T$ $\rightarrow G^{-1} B_3 u = G^{-1} \{1,0,0\}^T$ $\rightarrow B_{3Orig} u = y_{3d}$ It is interesting to note that the transformation G has only to be non-singular for the above equation to hold, i.e., rotation matrices are not required. Thus, the solution u to $B_{3Orig} u = y_{3d}$ is also the solution to $G\ B_{3Orig} u = Gy_{3d}$ for any given G, $|G| \ne 0$.

Solution of the Two-Dimensional Problem

Any solution to the two-dimensional problem may be used. The method described in this section is robust and reasonably efficient. The method does require that a list of m elements be sorted, for which algorithms are readily available.

Two-Dimensional Geometry. The two-dimensional projection we are considering is that which results from retaining just the first two rows of $B_3$ and the first two components of $y_{3d}$. Denote the 2-dimensional problem as $B_2$ and $y_{2d}$, $$B_3 = \begin{bmatrix} r_1 \\ r_2 \\ r_3 \end{bmatrix}, \quad y_{3_d} = \begin{Bmatrix} 1 \\ 0 \\ 0 \end{Bmatrix}, B_2 = \begin{bmatrix} r_1 \\ r_2 \end{bmatrix}, y_{2_d} = \begin{Bmatrix} 1 \\ 0 \end{Bmatrix}$$

The row vectors $r_i$ are rows of $B_n$. Thus, $B_2$, $u_{Min}$, $u_{Max}$, and $y_{2d}$ collectively define a two-dimensional, m-control allocation problem. The two-dimensional subset of attainable moments is denoted $\Phi_2$, and is the projection of $\Phi_3$ into the plane of $y_1$-$y_2$. Thus, $l_2 = (\alpha_2, 0)$, $\alpha_2 \ge 0$, and the optimal solution is at the point $p_2 = (\alpha_{2Max}, 0)$, $p_2 \in \partial(\Phi_2)$. The existence of the point $p_2$ is assumed.

Denote the vertices $\Phi_2$ as $v^y_i = \{v^y_{i,1}, v^y_{i,2}\}^T \in \Re^2$, i=1 ... $n_v$. In general, there exists one vertex, denoted by $v^y_1$ whose $y_1$ component $v^y_{1,1}$ is greater than or equal to that of all other vertices:

$v_1^y = \{\{v_{1,1}^y, v_{1,2}^y\}^T \in \Phi_2 | v_{1,1}^y \ge v_{i,1}^y,\ i=2 \ldots n_v\}$ In FIG. 21(b), $v^y_1$ is the vertex denoted $v_3$. (In subsequent rotations of $\Phi_3$ the same vertex is always $v^y_1$ since the values of $y_1$ components will not change). The vertex is properly labeled in FIG. 22. In the event there is more than one vertex that share the maximum $y_1$ component, any one may be chosen for purposes of this discussion.

Figure 22:
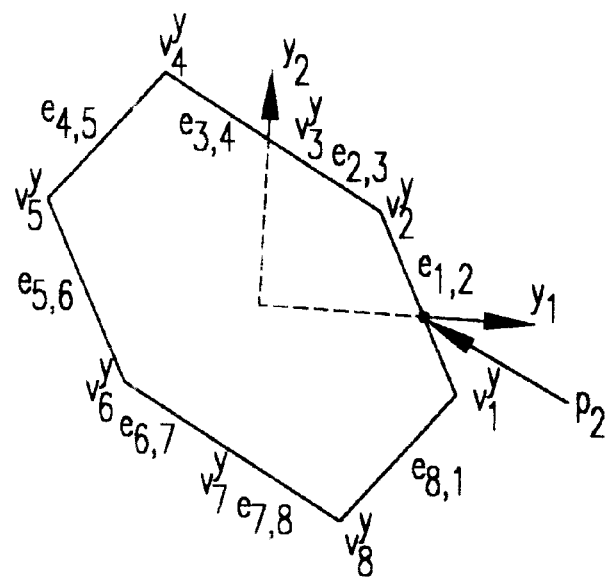
FIG. 22 is a diagram showing vertices and an edge-crossing solution for the two-dimensional projection shown in FIG. 20(b)

Denote by $v = \{v^y_1, \ldots v^y_{n_v}\}$ the ordered set of all vertices $\partial(\Phi_2)$. The vertices are placed in clockwise order about $\Phi_2$ if the $y_2$ component of $v^y_1$ is positive or zero, $v^y_{1,2} \ge 0$, and ordered counterclockwise otherwise. Denote by $\epsilon = \{e^y_{i,i+1}, e^y_{n_v,1}\}$, i=1 ... $n_v-1$ the set of edges $\Phi_2$ generated by connecting two consecutive vertices v. Thus, $\epsilon$ is the convex hull of $\Phi_2$. FIG. 22 depicts these definitions for the figure introduced in FIG. 20(b).

Determination of the Edge. One of the edges $e^y_{ip,ip+1} \equiv e^y_p$ contains the point $p_2$. This edge is characterized by the fact that it crosses the $y_1$ axis, or $\text{sgn}(v_{ip,2}^y) \ne \text{sgn}(v_{ip+1,2}^y)$ There will be two such edges, but by ordering the vertices in the clockwise or counterclockwise manner described, the solution edge is always the first such one encountered in traversing the edges in e starting at $e^y_{1,2}$. Thus, if we have $v^y_1$, and the sets v and $\epsilon$, the two-dimensional optimal control allocation problem is easily solved.

We begin by finding $v^u_1$ and $v^y_1$ as follows:

1. Determine the controls $v^u_1$ that generate $v^y_1$, by inspection of the first row of $B_2$: If $B_2(1, i) < 0$, then the $i^{th}$ control in $v^u_1$, $v^u_{1,i}$ is $u_{Min}$. Otherwise, it is $u_{Maxi}$. This maximizes the product of the first row of $B_2$ with u, which is the $y_1$ of $B_2 u$.

2. Calculate $v^y_1 = B_2\ v^u_1$.

Now, consider a continuous rotation of the $y_1$-$y_2$ axes through an angle $\phi$ to new coordinates $y'_1$-$y'_2$. The rotation is represented by:

$$B_2' = TB_2 = \begin{bmatrix} r_1' \\ r_2' \end{bmatrix}$$

We take the rotation matrix to be clockwise if $v^y_{1,2} \ge 0$, and counterclockwise otherwise:

$$T = \begin{bmatrix} \cos\phi & s\sin\phi \\ -s\sin\phi & \cos\phi \end{bmatrix}, s \equiv sgn(v_{1,2}^y)$$

As the axes are rotated the vertex with the maximum $y'_1$ component changes; through a complete rotation each vertex on $\partial(\Phi_2)$ will be identified, thus generating $v$. New vertices will be identified as signs of the entries in $r'_1$ change. The angle at which a sign change takes place is the angle at which an entry in $r'_1$ becomes zero. The angle $\phi_j$ at which the $j^{th}$ entry $r'_{1,j}$ of $r'_1$ is zero is given by $$r'_{1,j} = r_{1,j} \cos\phi_j + r_{2,j} \sin\phi_j = 0$$

$$\phi_j = \pm\tan^{-1}(r_{1,j}/r_{2,j}), 0 \leq \phi_j < 2\pi$$

The ± sign here means to take both angles, which are then placed in the range of principal values $0 < \phi_j < 2\pi$. By calculating $\phi_j$, $j = 1 \ldots m$, a list of 2 m angles is created. Consider the least of these angles, say $\phi_i$, $\phi_i = \min(\phi_j)$, $j = 1 \ldots 2m$. In the continuous rotation (here counterclockwise), $\phi_i$ would be the angle at which $v_1^y$ just ceases being the vertex with the maximum $y'_1$ component. The new vertex with maximum $y'_1$ component will differ from $v_1^0$ only in the $i^{th}$ entry. The same would obviously be true for the greatest of the angles generated, except a clockwise path is described. Hence the list, originally ordered by control numbering, is sorted from greatest to least (clockwise) or from least to greatest (counterclockwise), along with their original indices. The resulting list of indices is the sequence in which controls change from vertex to vertex, beginning at $v_1^0$ and progressing around $\partial(\Phi)$. Hence the set of vertices $v$ and the set of edges $\epsilon$ are easily constructed. In summary, 1. Calculate the list $L_\phi = \{\phi_j\}$; associated with this list is a list of control numbers $L_u$.

$$\phi_j = \pm\tan^{-1}(r_{1,j}/r_{2,j}), 0 \leq \phi_j < 2\pi, j = 1 \ldots m$$

$$L_u = \{1, 1, 2, 2, \ldots, m, m\}$$

2. Sort $L_\phi$ from least to greatest if $v_{1,2}^y < 0$, or greatest to least if $v_{1,2}^y \geq 0$. Sort $L_u$ along with $L_\phi$, and denote the result $L'_u$.

3. Beginning with $v_1^0$ generate as many elements of $v$ and $\epsilon$ as needed. Given the $i^{th}$ element of $L'_u$ is the integer $j$, $v_{i+1}^0$ is obtained from $v_i^0$ by changing the sign of the $j^{th}$ component of $v_i^0$. Then any edge $e_{i,i+1}^0 = v_i^0 \cup v_{i+1}^0$, and $e_{n_v,1}^y = v_{2m}^0 \cup v_1^0$.

4. As each new vertex $v_i^0$ is generated, find $v_i^u$ and $v_i^y$. When $sgn(v_{i,2}^y) \neq sgn(v_{i+1,2}^y)$ then $e_p^0 = v_i^0 \cup v_{i+1}^0 \equiv v_{i_p}^0 \cup v_{i_p+1}^0$ contains the point $p_2$.

5. The $y_3$ component of $e_p^y$, at the point its $y_2$ component is zero, is calculated, and the $y_3$ component's sign used to determine if $e_p^y$ is in front of or behind $l_3$.

Implementation Notes:

1. The actual angles $\phi$ are not needed, just their ordering. Actual calculation of the arctangent is not required.

2. Although we describe the list as $0 \leq \phi_j < 2\pi$, the whole range in needed only if the entire convex hull of $\Phi_2$ is to be generated. For purposes of identifying $e_p^0$, only those angles in the first and fourth quadrants are needed.

The objective of the rotations $T(\theta)$ is to find two edges, one in front of and the other behind $l_3$, separated by a suitably small rotation angle. In the current real-time implementations a bisection method is used. Beginning with the original orientation, the two-dimensional problem is solved and the edge is tested to determine if it is in front of or behind $l_3$. Rotations of $\theta = \pi/4$ are performed, and each edge thus generated is tested. When two consecutive edges are found, one in front of and one behind $l_3$, the angle $\theta$ is halved and the direction of rotation reversed. A set number of bisections is performed and the last two edges satisfying the criteria are retained. Thus, for eight bisections the last rotation is through an angle of about 1/6°, which is sufficiently small for most problems.

Given a half-line $l_3$ in the direction of some arbitrary desired objective $y_{3_d}$, to find the intersection of $l_3$ with $\partial(\Phi_3)$ means to find the facet $f^y$, $dim(f^0) = 2$, on $\partial(\Phi_3)$ that contains the intersection. We will generate candidate facets by finding two edges $e_1^y \subset \partial(\Phi_3)$ and $e_2^y \subset \partial(\Phi_3)$, and their union $o^0 = e_1^0 \cup e_1^0$.

If $dim(o^0) = 2$ then $o^y$ is a candidate $f^y$. We then test $f^y$ to determine if it contains the intersection of $l_3$.

The facet $f^0$ is 2-dimensional and has two zeros in (say) the $i^{th}$ and $j^{th}$ positions. The four vertices of $f^0$ are constructed by assigning all combinations of $-1$ and $+1$ to those positions. Construct three vertices as the following combinations in the $i^{th}$ and $j^{th}$ positions: $(1, 1)$ (object $v_1^0$), $(1, -1)$ (object $v_2^0$), and $(-1, 1)$ (object $v_3^0$). Hence $e_{1,2}^0 = v_1^0 \cup v_2^0$ and $e_{1,3}^0 = v_1^0 \cup v_3^0$ are both edges of $f^0$. That is, we have a vertex and two edges emanating from that vertex. Thus, all points $p_f$ on $f^y$ are given by the vector equation, $$p_f = v_1^y + C_{1,2}(v_2^y - v_1^y) + C_{1,3}(v_3^y - v_1^y)$$

$$0 \leq C_{1,2} \leq 1, 0 \leq C_{1,3} \leq 1$$

Note that the vertices $v_1^y$, $v_2^y$, and $v_3^y$, are generally not the same as those defined for $\Phi_2$ (as in equation 8). The half-line $l_3$ consists of all points $(\alpha_3, 0, 0) = \alpha_3 \hat{e}_3 \geq 0$. In order for $f^y$ to contain the intersection $p_3$ of $l_3$ it is necessary and sufficient that there be some point on $l_3$ that satisfies equation 12. In other words, we solve the following equation for $\alpha_3$, $C_{1,2}$, and $C_{1,3}$:

$$\begin{Bmatrix} \alpha_3 \\ C_{1,2} \\ C_{1,3} \end{Bmatrix} = [\hat{e}_{3,1}(v_1^y - v_2^y)(v_1^y - v_3^y)]^{-1} v_1^y$$

Then if $\alpha_3 \geq 0$, $0 \leq C_{1,2} \leq 1$, and $0 \leq C_{1,3} \leq 1$, $f^y$ is the solution facet, and the optimal solution $u^u$ is $$u^u = v_1^u + C_{1,2}(v_2^u - v_1^u) + C_{1,3}(v_3^u - v_1^u)$$

Approximations. In combining the two edges $e_1^y \subset \partial(\Phi_3)$ and $e_2^y \subset \partial(\Phi_3)$, and their union $o^0 = e_1^0 \cup e_1^0$, two problems can arise:

1. The union of $o^0$ may be a facet but not contain $p_3$.
2. The union of $o^0$ may not be a facet, i.e., $dim(o^0) \neq 2$.

Case 1 is rare, and usually occurs when $p_3$ is very near a vertex. For case 2, it is extremely rare for $dim(o^0) < 2$. For any of the described cases, however, the approximation set forth in FIG. 23 returns very good results.

Figure 23:
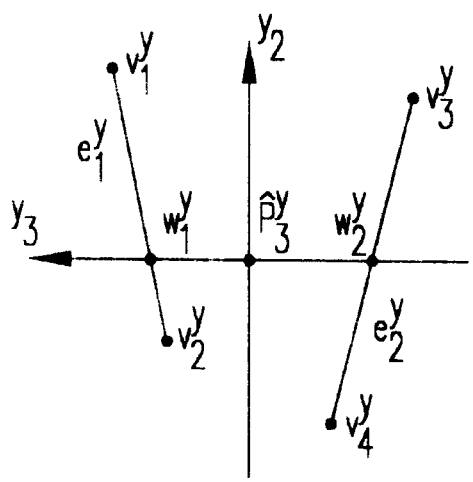
FIG. 23 is a diagram showing an approximation of a solution of a control allocation space computed in accordance with the present invention.

With reference to FIG. 23, the approximation is performed entirely in the $y_2$-$y_3$ plane. The two edges $e_1^y$ and $e_2^y$ are shown, with $e_1^y$ in front of $l_3$ and $e_2^y$ behind. Also, the vertices defining the two edges are depicted with $v_1^y$ and $v_3^y$ above, and $v_2^y$ and $v_4^y$ below $l_3$.

The approximation is performed by interpolating along each edge to find points $w_1^y$ and $w_2^y$, then interpolating between $w_1^y$ and $w_2^y$ to find the point of intersection with $l_3$, denoted $\hat{p}_3^y$. That is, the scalar interpolation factors $k_i$, $i = 1 \ldots 3$ are determined such that $$w_1^y = k_1 v_1^y + (1 - k_1) v_2^y$$

$$w_2^y = k_2 v_3^y + (1-k_2) v_4^y$$

$$\hat{p}_3^y = k_3 w_1^y + (1-k_3) w_2^y$$

The solution u is approximated by $$u = \hat{p}_3'' = k_3 w_1'' + (1-k_3) w_2''$$

In using this approximation, one must check that the resulting control deflections are within their limits and truncate them, if necessary.

Implementation

The method of the present invention was tested in version 5 of MATLAB. Uniformly random $B_3$ matrices and desired objectives were generated for numbers of controls ranging from four to twenty. The values in the $B_3$ matrices were within the range ±1, and control limits were set at ±1 for each case.

It was verified that the algorithm displayed computational requirements that varied linearly with the number of controls. The maximum number of floating-point operations ($n_{flops}$) for the edge-searching algorithm varied as $n_{flops} = 1701 + 264(m-4) (r^2=0.994)$.

The facet-searching algorithm previously employed displayed quadratic dependency, $n_{flops} = 6968 - 1244(m-4) + 901(m-4)^2 (r^2=0.999)$.

With respect to errors that resulted from approximations to the solution, 100 problems were generated for each case of four through twenty controls. Percentages of error were defined as follows:

$$Err(\%) = 100 \cdot \frac{\|p_3^y - \hat{p}_3^y\|_2}{\|p_3^y\|_2}$$

where $p^y3$ is the optimal objective and $\hat{p}^y_3$ is the objective generated by the approximate solution.

With five bisections maximum, the number of errors ranged from three per hundred cases with few (4 to 6) controls, to 17 per hundred cases for 19 controls. Increasing the maximum permitted number of bisections generally decreased the number of errors. The greatest maximum error encountered was 4.4%, and the least maximum error was 0.034%. The greatest maximum error decreased rapidly as the number of controls was increased. For numbers of controls greater than seven, no errors greater than 1% were generated in any of the several thousand cases tested with numbers of bisections from five to eight.

F-15 ACTIVE Simulation. Extensive real-time evaluations of the edge-searching algorithm were conducted using an F-15 ACTIVE (Advanced Control Technology for Integrated Vehicles) simulation. The F-15 ACTIVE control law and mixer were implemented in the modified 2FI22A motion based simulator at Virginia Polytechnic Institute & State University. All simulations were run at a 100 Hz frame rate.

The F-15 ACTIVE utilized twelve control effectors with individual position and rate limits. The effectors were left/right horizontal tails, left/right ailerons, left/right canards, left/right rudders, left/right trailing edge flaps, left/right pitch thrust vectoring and left/right yaw thrust vectoring.

A comparison of the original control mixer with the edge-searching control allocation method was performed. Framewise, or moment rate allocation was implemented with various restoring methods, including minimum-norm and minimum-drag. The high-fidelity control law of the F-15 ACTIVE was retained. Off-line "batch" as well as real-time piloted simulations were completed to evaluate the performance of the allocators. The aircraft was flown real-time through highly aggressive air-combat maneuvering and terrain-following tasks. Various tests intended to stress the control allocator were performed, including reduced control effectiveness, and realtime reconfiguration following simulated control failures.

The results of all of these evaluations were unremarkable. No problems specific to the control allocation method were encountered during the simulation.

Figure 24:
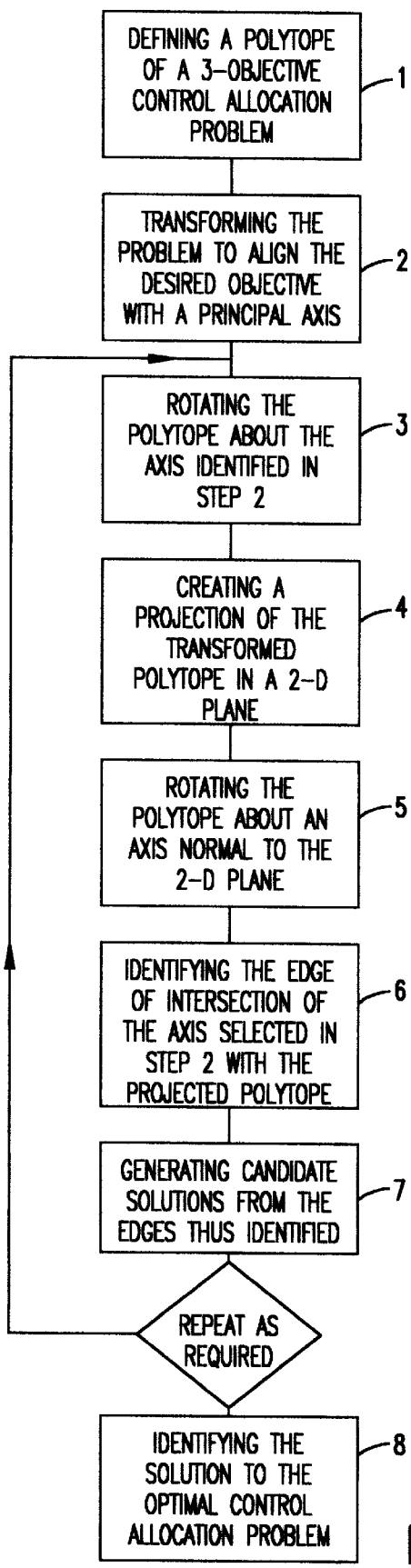
FIG. 24 is a flow diagram showing steps included in the method of the present invention.

FIG. 24 is a flow diagram showing steps included in the method of the present invention. The method begins by defining a solution space which contains a polytope that represents the optimal solutions of a three-objective control allocation problem. (Block 1). The problem is then transformed to align the desired objective with a principal axis. (Block 2). The following five steps are then repeated a fixed number of times or until a solution is found, whichever comes first. The polytope is transformed by rotation about the axis identified in step 2 (Block 3) and the transformed polytope is projected into a two-dimensional plane (Block 4). Solution edges are identified by rotating the two-dimensional polytope about an axis normal to the two-dimensional plane (Blocks 5 and 6). The solution edges are those containing the intersections of the axis selected in step 2 with the projected polytope. The edges thus identified are combined to generate candidate solutions (Block 7). Candidate solutions are tested to determine the solution to the optimal control allocation problem. (Block 8).

Other modifications and variations to the invention will be apparent to those skilled in the art from the foregoing disclosure. Thus, while only certain embodiments of the invention have been specifically described herein, it will be apparent that numerous modifications may be made thereto without departing from the spirit and scope of the invention.

For example, while the invention has heretofore been described as setting the control effectors for an aircraft, those skilled in the art can appreciate that the present invention also has direct application to the control of any dynamic system that utilizes control effectors that are redundant, and limited in their ranges of application and effectiveness. Examples of these dynamic systems include the control of robots, the control of spacecraft, the control of chemical reactions and processes, and the control of manufacturing processes.

Moreover, the problem solved by the present invention may also be solved by a well-established method known as Linear Programming (LP). The present invention, however, is superior to LP methods in that it requires far fewer calculations to solve the problem than LP methods. It follows that there are LP problems, not restricted to flight control applications, that may be solved by the present invention. Examples of LP problems that may be solved with greater computational efficiency by the present invention are optimal distribution of limited resources in planning, routing, scheduling, assignment, and design. Industries that make use of LP and its extensions include transportation, energy, telecommunications, and manufacturing of many kinds.

I claim:

1. A method for calculating a solution to a three-objective control allocation problem, comprising:
   (a) defining a solution space which contains a polytope that represents an optimal solution of said three-objective control allocation problem;
   (b) transforming the problem to align a desired objective with a first of a plurality of axes;
   (c) rotating the polytope about said first axis;
   (d) creating a projection of said rotated polytope in a two-dimensional plane;

(e) rotating the polytope about a second of said plurality of axes which is normal to said two-dimensional plane;

(f) identifying an edge of intersection of said first axis with the projected polytope;

(g) generating at least one candidate solution from the identified edge;

(h) repeating steps (c)–(g) a predetermined number of times to identify an optimal solution to the three-objective control allocation problem.

2. The method of claim 1, further comprising:

setting control effectors of a dynamic system based on said solution to the three-objective control allocation problem.

3. The method of claim 2, wherein said dynamic system is an aircraft.

4. The method of claim 2, wherein said dynamic system is a robot.

5. The method of claim 2, wherein said dynamic system is a spacecraft.

6. The method of claim 2, wherein said dynamic system is one which controls chemical reactions and processes.

7. The method of claim 2, wherein said dynamic system is one which controls a manufacturing process.

8. The method of claim 1, wherein said second axis is a half line.

9. A method for calculating a solution to a three-objective control allocation problem, comprising:

transforming said control allocation problem into a polytope, said transforming step including aligning a desired objective with one of three axes;

creating a projection of said polytope on a two-dimensional plane;

determining a first edge of the projection of said polytope in the two-dimensional plane which crosses a half-line oriented in the direction of said desired objective;

rotating said polytope about another of said three axes;

creating a projection of said rotated polytope on a two-dimensional plane;

determining a second edge of the projection of said rotated polytope in the two-dimensional plane which crosses said half-line oriented in the direction of said desired objective;

forming a union of said first and second edges; and determining a solution to the control allocation problem based on the union of said first and second edges.

10. The method of claim 9, further comprising:

setting control effectors of a dynamic system based on said solution to the control allocation problem.

11. The method of claim 9, wherein one of said first and second edges is in front of said half-line and the other of said first and second edges is behind said half-line.

12. The method of claim 9, wherein if the union of said first and second edges lies on a facet of said polytope, said solution is an optimal solution.

13. The method of claim 9, wherein if the union of said first and second edges does not lie on a facet of said polytope, said solution is deemed not to be optimal, said method further comprising approximating an near-optimal solution.

* * * * *